US011489638B2

(12) United States Patent
Manolakos et al.

(10) Patent No.: US 11,489,638 B2
(45) Date of Patent: Nov. 1, 2022

(54) MEASUREMENT REPORT TRIGGERING TECHNIQUES FOR MULTIPLE COMPONENT CARRIERS

(71) Applicant: QUALCOMM Incorporated, San Diego, CA (US)

(72) Inventors: Alexandros Manolakos, San Diego, CA (US); Parisa Cheraghi, San Diego, CA (US); Hari Sankar, San Diego, CA (US); Joseph Binamira Soriaga, San Diego, CA (US); Tao Luo, San Diego, CA (US); Tingfang Ji, San Diego, CA (US); Peter Gaal, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 97 days.

(21) Appl. No.: 16/701,283

(22) Filed: Dec. 3, 2019

(65) Prior Publication Data
US 2020/0186302 A1 Jun. 11, 2020

Related U.S. Application Data

(60) Provisional application No. 62/775,881, filed on Dec. 5, 2018.

(51) Int. Cl.
H04L 5/00 (2006.01)
H04W 72/04 (2009.01)
H04L 1/16 (2006.01)

(52) U.S. Cl.
CPC ............ H04L 5/001 (2013.01); H04L 1/1642 (2013.01); H04L 5/0051 (2013.01); H04W 72/042 (2013.01); H04W 72/0446 (2013.01)

(58) Field of Classification Search
CPC ......... H04W 72/1289; H04W 72/0413; H04W 72/042; H04W 72/0453; H04W 72/0446;
(Continued)

(56) References Cited

U.S. PATENT DOCUMENTS

2018/0263064 A1   9/2018  Islam et al.
2020/0022175 A1*  1/2020  Xiong ..................... H04L 5/001
2020/0044796 A1*  2/2020  Yang ...................... H04L 5/0092

FOREIGN PATENT DOCUMENTS

WO    WO-2018175820 A1    9/2018

OTHER PUBLICATIONS

Intel Corporation: "Scheduling and UCI Feedback for Carrier Aggregation", 3GPP Draft, 3GPP TSG-RAN WG1 NR Ad-Hoc #2, R1-1710578, 3rd Generation Partnership Project (3GPP), Mobile Competence Centre; 650, Route Des Lucioles; F-06921 Sophia-Antipolis Cedex; France, vol. RAN WG1, No. Qingdao, P.R. China, Jun. 27, 2017-Jun. 30, 2017, Jun. 26, 2017 (Jun. 26, 2017), XP051299785, 5 pages, Retrieved from the Internet: URL:http://www.3gpp.org/ftp/Meetings_3GPP_SYNC/RAN1/Docs/ [retrieved on Jun. 26, 2017], Sect. 2.2, figures 1, 2.

(Continued)

Primary Examiner — Dady Chery
(74) Attorney, Agent, or Firm — Holland & Hart LLP

(57) ABSTRACT

Methods, systems, and devices for wireless communications are described that identify a minimum gap between a control channel transmission on a first component carrier (CC) that triggers a measurement report and an associated reference signal transmission on a second CC. The minimum gap may be based on a resource associated with a control channel transmission and a resource associated with the reference signal transmission. The first CC and the second CC have different numerologies and the minimum gap may be identified in terms of a number of OFDM symbols of the second CC that carries the reference signal transmission. The mini- (Continued)

mum gap also may be identified based on a location of the control channel transmission within a slot of the first CC. In cases where beam switching is used, the minimum gap may be further based at least in part on a beam switch time for performing the beam switching.

32 Claims, 19 Drawing Sheets

(58) Field of Classification Search
CPC ... H04L 1/1854; H04L 1/1861; H04L 5/0055; H04L 27/26025; H04L 5/0064; H04L 5/14; H04L 5/0078; H04L 5/001; H04L 5/0053; H04L 5/0094; H04L 5/0051; H04L 72/0446; H04L 72/042; H04L 1/1642; H04L 5/0007; H04L 5/0023
See application file for complete search history.

(56) References Cited

OTHER PUBLICATIONS

International Search Report and Written Opinion—PCT/US2019/064451—ISA/EPO—dated Mar. 31, 2020.
Qualcomm Incorporated: "Maintenance for SRS", 3GPP Draft, 3GPP TSG RAN WG1 Meeting #92, R1-1802830, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 26, 2018-Mar. 2, 2018, Feb. 17, 2018 (Feb. 17, 2018), XP051398243, 6 pages, Retrieved from the Internet: URL: http://www.3gpp.org/ftp/tsg%5Fran/WG1%5FRL1/TSGR1%5F92/Docs/ [retrieved on Feb. 17, 2018] Sect. 2.1.1.

* cited by examiner

AP-CSI-RS Numerology

|  | 15 kHz (μ=0) | 30 kHz (μ=1) | 60 kHz (μ=2) | 120 kHz (μ=3) |
|---|---|---|---|---|
| 15 kHz | - | 12 | 24 | 48 |
| 30 kHz | 0 | - | 12 | 24 |
| 60 kHz | 0 | 0 | - | 12 |
| 120 kHz | 0 | 0 | 0 | - |

PDCCH Numerology

400

AP-CSI-RS Numerology

| PDCCH Numerology | 15 kHz (μ=0) | 30 kHz (μ=1) | 60 kHz (μ=2) | 120 kHz (μ=3) |
|---|---|---|---|---|
| 15 kHz | - | 12 | 24 + BM-Switch | 48 + BM-Switch |
| 30 kHz | 0 | - | 12 + BM-Switch | 24 + BM-Switch |
| 60 kHz | 0 | 0 | - | 12 + BM-Switch |
| 120 kHz | 0 | 0 | 0 | - |

500

AP-CSI-RS Numerology

| | Min X Value | 15 kHz | 30 kHz | 60 kHz | 120 kHz |
|---|---|---|---|---|---|
| PDCCH Numerology | 15 kHz | - | 2 | 3 | 5 |
| | 30 kHz | 0 | - | 2 | 3 |
| | 60 kHz | 0 | 0 | - | 2 |
| | 120 kHz | 0 | 0 | 0 | - |

MEASUREMENT REPORT TRIGGERING TECHNIQUES FOR MULTIPLE COMPONENT CARRIERS

CROSS REFERENCE

The present application for patent claims the benefit of U.S. Provisional Patent Application No. 62/775,881 by Manolakos et al., entitled "MEASUREMENT REPORT TRIGGERING TECHNIQUES FOR MULTIPLE COMPONENT CARRIERS," filed Dec. 5, 2018, assigned to the assignee hereof, and expressly incorporated by reference herein.

BACKGROUND

The present disclosure relates to wireless communications, and more specifically to measurement report triggering techniques for multiple component carriers.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a UE and a base station may establish a connection via two or more component carriers (CCs). Further, one or more parameters associated with each CC (e.g., a transmission power, modulation and coding scheme (MCS), etc.) may be based on current channel conditions that may be measured based on one or more transmitted reference signals (e.g., a channel state information (CSI) reference signal (CSI-RS)). In some cases, an aperiodic measurement report based on a CIS-RS may be triggered by a base station using a first CC, and the associated CSI-RS transmissions may use a second CC. A UE may receive the trigger in a control channel transmission on the first CC, perform measurements on the CSI-RS on the second CC, and transmit a measurement report to the base station. In order to reduce buffering of the second CC at the UE, certain offsets between the trigger and the CSI-RS transmission may be provided. Efficient identification and management of such offsets may be desirable to enhance the efficiency of a wireless communications system.

SUMMARY

The described techniques relate to improved methods, systems, devices, and apparatuses that support measurement report triggering techniques for multiple component carriers. In various aspects, the described techniques provide for identifying a minimum gap between a control channel transmission on a first component carrier (CC) that triggers a measurement report and an associated reference signal transmission on a second CC. In some cases, the minimum gap is based on an orthogonal frequency division multiplexing (OFDM) symbol location of the control channel transmission. In some cases, the first CC and the second CC have different numerologies and the minimum gap is identified in terms of a number of OFDM symbols of the second CC that carries the reference signal transmission. In other cases, the minimum gap may be identified based on a location of the control channel transmission within a slot of the first CC. Further, in some cases, a user equipment (UE) may perform beam switching between the two CCs, and the minimum gap may be further based at least in part on a beam switch time for performing the beam switching.

A method of wireless communication at a UE is described. The method may include establishing a connection with a base station via at least a first CC and a second CC, where the first CC has a different numerology than the second CC, identifying a minimum gap between a resource associated with a downlink control channel transmission on the first CC and a resource associated with a reference signal transmission on the second CC, receiving the downlink control channel transmission via the first CC, receiving, responsive to the downlink control channel transmission, the reference signal transmission on the second CC based on the minimum gap, and measuring one or more channel characteristics of the reference signal transmission.

An apparatus for wireless communication at a UE is described. The apparatus may include a processor, memory coupled with the processor, and instructions stored in the memory. The instructions may be executable by the processor to cause the apparatus to establish a connection with a base station via at least a first CC and a second CC, where the first CC has a different numerology than the second CC, identify a minimum gap between a resource associated with a downlink control channel transmission on the first CC and a resource associated with a reference signal transmission on the second CC, receive the downlink control channel transmission via the first CC, receive, responsive to the downlink control channel transmission, the reference signal transmission on the second CC based on the minimum gap, and measure one or more channel characteristics of the reference signal transmission.

Another apparatus for wireless communication at a UE is described. The apparatus may include means for establishing a connection with a base station via at least a first CC and a second CC, where the first CC has a different numerology than the second CC, identifying a minimum gap between a resource associated with a downlink control channel transmission on the first CC and a resource associated with a reference signal transmission on the second CC, receiving the downlink control channel transmission via the first CC, receiving, responsive to the downlink control channel transmission, the reference signal transmission on the second CC based on the minimum gap, and measuring one or more channel characteristics of the reference signal transmission.

A non-transitory computer-readable medium storing code for wireless communication at a UE is described. The code may include instructions executable by a processor to establish a connection with a base station via at least a first CC and a second CC, where the first CC has a different numerology than the second CC, identify a minimum gap between a resource associated with a downlink control channel transmission on the first CC and a resource associated with a reference signal transmission on the second CC, receive the downlink control channel transmission via the first CC, receive, responsive to the downlink control channel transmission, the reference signal transmission on the second CC based on the minimum gap, and measure one or more channel characteristics of the reference signal transmission.

In some examples of the method, apparatuses, and non-transitory computer-readable medium described herein, the resource associated with the downlink control channel transmission includes an orthogonal frequency division multiplexing (OFDM) symbol of the downlink control channel transmission on the first CC, the resource associated with the reference signal transmission includes an OFDM symbol of the reference signal transmission on the second CC, and the minimum gap may be measured in OFDM symbols of a numerology of the second CC.

In some examples of the method, apparatuses, and non-transitory computer-readable medium described herein, the resource associated with the downlink control channel transmission includes a first slot containing the downlink control channel transmission on the first CC, the resource associated with the reference signal transmission includes a second slot containing the reference signal transmission on the second CC, and the minimum gap may be measured as a number of slots of the second CC, where the minimum gap may be identified based on a location of the downlink control channel transmission within the first slot.

Some examples of the method, apparatuses, and non-transitory computer-readable medium described herein may further include operations, features, means, or instructions for transmitting an indication of the minimum gap to the base station.

In some examples of the method, apparatuses, and non-transitory computer-readable medium described herein, the minimum gap may be measured with respect to a first or last orthogonal frequency division multiplexing (OFDM) symbol of the downlink control channel transmission relative to a first or last OFDM symbol of the reference signal transmission.

In some examples of the method, apparatuses, and non-transitory computer-readable medium described herein, the indication of the minimum gap may be provided for a set of different combinations numerologies of the first CC and the second CC.

In some examples of the method, apparatuses, and non-transitory computer-readable medium described herein, the minimum gap may be prespecified at the UE and the base station for each of a set of different numerology combinations.

In some examples of the method, apparatuses, and non-transitory computer-readable medium described herein, a same minimum gap may be provided for each of the set of different numerology combinations.

In some examples of the method, apparatuses, and non-transitory computer-readable medium described herein, the minimum gap may be further based on a beam switching gap of the UE.

In some examples of the method, apparatuses, and non-transitory computer-readable medium described herein, the minimum gap may be determined as a sum of a minimum offset between the downlink control channel transmission and the reference signal transmission and the beam switching gap, or based on a maximum value of the minimum offset or the beam switching gap.

In some examples of the method, apparatuses, and non-transitory computer-readable medium described herein, the minimum offset may be prespecified for each of a set of different numerology combinations.

In some examples of the method, apparatuses, and non-transitory computer-readable medium described herein, a same minimum offset may be provided for each of the set of different numerology combinations.

In some examples of the method, apparatuses, and non-transitory computer-readable medium described herein, the minimum gap may be identified when the second CC may have a shorter resource duration than the first CC.

In some examples of the method, apparatuses, and non-transitory computer-readable medium described herein, the minimum gap may be determined based on a duration of the downlink control channel transmission and a scaling factor, where the scaling factor may be proportional to a difference in the numerologies of the first CC and the second CC.

In some examples of the method, apparatuses, and non-transitory computer-readable medium described herein, the minimum gap may be provided for each frequency band combination configured for the connection with the base station, for each frequency band pair combination configured for the connection with the base station, or any combinations thereof.

In some examples of the method, apparatuses, and non-transitory computer-readable medium described herein, the UE transmits minimum gap information to the base station that indicates minimum gaps for two or more frequency band combinations configured for the connection with the base station, two or more frequency band pair combinations configured for the connection with the base station, one or more frequency band pair combination that may be unsupported by the UE, or any combinations thereof.

Some examples of the method, apparatuses, and non-transitory computer-readable medium described herein may further include operations, features, means, or instructions for reporting the one or more measured channel characteristics of the reference signal to the base station if the UE is configured for reporting.

A method of wireless communication is described. The method may include establishing a connection with a base station via at least a first CC and a second CC, where the first CC has a first numerology and associated first slot duration, and the second CC has a second numerology and associated second slot duration that is shorter than the first slot duration, identifying a minimum gap, as a number of slots of the second CC, between a first slot containing a downlink control channel transmission on the first CC and a second slot containing a reference signal transmission on the second CC, where the minimum gap is identified based on a location of the downlink control channel transmission within the first slot, receiving the downlink control channel transmission via the first CC, receiving, responsive to the downlink control channel transmission, the reference signal transmission on the second CC based on the minimum gap, and measuring one or more channel characteristics of the reference signal transmission.

An apparatus for wireless communication is described. The apparatus may include a processor, memory coupled with the processor, and instructions stored in the memory. The instructions may be executable by the processor to cause the apparatus to establish a connection with a base station via at least a first CC and a second CC, where the first CC has a first numerology and associated first slot duration, and the second CC has a second numerology and associated second slot duration that is shorter than the first slot duration, identify a minimum gap, as a number of slots of the second CC, between a first slot containing a downlink control channel transmission on the first CC and a second slot containing a reference signal transmission on the second CC, where the minimum gap is identified based on a location of the downlink control channel transmission within the first slot, receive the downlink control channel transmission via the first CC, receive, responsive to the downlink control channel transmission, the reference signal transmission on the second CC based on the minimum gap, and measure one or more channel characteristics of the reference signal transmission.

Another apparatus for wireless communication is described. The apparatus may include means for establishing a connection with a base station via at least a first CC and a second CC, where the first CC has a first numerology and associated first slot duration, and the second CC has a second numerology and associated second slot duration that is shorter than the first slot duration, identifying a minimum gap, as a number of slots of the second CC, between a first slot containing a downlink control channel transmission on the first CC and a second slot containing a reference signal transmission on the second CC, where the minimum gap is identified based on a location of the downlink control channel transmission within the first slot, receiving the downlink control channel transmission via the first CC, receiving, responsive to the downlink control channel transmission, the reference signal transmission on the second CC based on the minimum gap, and measuring one or more channel characteristics of the reference signal transmission.

A non-transitory computer-readable medium storing code for wireless communication is described. The code may include instructions executable by a processor to establish a connection with a base station via at least a first CC and a second CC, where the first CC has a first numerology and associated first slot duration, and the second CC has a second numerology and associated second slot duration that is shorter than the first slot duration, identify a minimum gap, as a number of slots of the second CC, between a first slot containing a downlink control channel transmission on the first CC and a second slot containing a reference signal transmission on the second CC, where the minimum gap is identified based on a location of the downlink control channel transmission within the first slot, receive the downlink control channel transmission via the first CC, receive, responsive to the downlink control channel transmission, the reference signal transmission on the second CC based on the minimum gap, and measure one or more channel characteristics of the reference signal transmission.

Some examples of the method, apparatuses, and non-transitory computer-readable medium described herein may further include operations, features, means, or instructions for reporting the one or more measured channel characteristics of the reference signal to the base station in the UE may be configured for reporting.

In some examples of the method, apparatuses, and non-transitory computer-readable medium described herein, the minimum gap may be prespecified at the UE and the base station for each of a set of different numerology combinations.

In some examples of the method, apparatuses, and non-transitory computer-readable medium described herein, a same minimum gap may be provided for each of the set of different numerology combinations.

Some examples of the method, apparatuses, and non-transitory computer-readable medium described herein may further include operations, features, means, or instructions for transmitting an indication of the minimum gap to the base station.

In some examples of the method, apparatuses, and non-transitory computer-readable medium described herein, the indication of the minimum gap may be provided for a set of different combinations numerologies of the first CC and the second CC.

In some examples of the method, apparatuses, and non-transitory computer-readable medium described herein, the minimum gap may be further based on a beam switching gap of the UE.

In some examples of the method, apparatuses, and non-transitory computer-readable medium described herein, the minimum gap may be determined as a sum of a minimum offset between the first slot and the second slot and the beam switching gap, or based on a maximum value of the minimum offset or beam switching gap.

In some examples of the method, apparatuses, and non-transitory computer-readable medium described herein, the minimum offset may be prespecified for each of a set of different numerology combinations.

In some examples of the method, apparatuses, and non-transitory computer-readable medium described herein, a same minimum offset may be provided for each of the set of different numerology combinations.

In some examples of the method, apparatuses, and non-transitory computer-readable medium described herein, the minimum gap may be identified responsive to the second slot duration being shorter than the first slot duration.

In some examples of the method, apparatuses, and non-transitory computer-readable medium described herein, the minimum gap may be provided for each frequency band combination configured for the connection with the base station, for each frequency band pair combination configured for the connection with the base station, or any combinations thereof.

In some examples of the method, apparatuses, and non-transitory computer-readable medium described herein, the UE transmits minimum gap information that indicates minimum gaps for two or more frequency band combinations configured for the connection with the base station, two or more frequency band pair combinations configured for the connection with the base station, one or more frequency band pair combination that may be unsupported by the UE, or any combinations thereof.

A method of wireless communication at a base station is described. The method may include establishing a connection with a UE via at least a first CC and a second CC, where the first CC has a different numerology than the second CC, identifying a minimum gap between a resource associated with a downlink control channel transmission on the first CC and a resource associated with a reference signal transmission on the second CC, transmitting the downlink control channel transmission to the UE via the first CC, and transmitting, responsive to the downlink control channel transmission, the reference signal transmission to the UE on the second CC based on the minimum gap.

An apparatus for wireless communication at a base station is described. The apparatus may include a processor, memory coupled with the processor, and instructions stored in the memory. The instructions may be executable by the processor to cause the apparatus to establish a connection with a UE via at least a first CC and a second CC, where the first CC has a different numerology than the second CC, identify a minimum gap between a resource associated with a downlink control channel transmission on the first CC and a resource associated with a reference signal transmission on the second CC, transmit the downlink control channel transmission to the UE via the first CC, and transmit, responsive to the downlink control channel transmission, the reference signal transmission to the UE on the second CC based on the minimum gap.

Another apparatus for wireless communication at a base station is described. The apparatus may include means for establishing a connection with a UE via at least a first CC and a second CC, where the first CC has a different numerology than the second CC, identifying a minimum gap between a resource associated with a downlink control channel transmission on the first CC and a resource associated with a reference signal transmission on the second CC, transmitting the downlink control channel transmission to the UE via the first CC, and transmitting, responsive to the downlink control channel transmission, the reference signal transmission to the UE on the second CC based on the minimum gap.

A non-transitory computer-readable medium storing code for wireless communication at a base station is described. The code may include instructions executable by a processor to establish a connection with a UE via at least a first CC and a second CC, where the first CC has a different numerology than the second CC, identify a minimum gap between a resource associated with a downlink control channel transmission on the first CC and a resource associated with a reference signal transmission on the second CC, transmit the downlink control channel transmission to the UE via the first CC, and transmit, responsive to the downlink control channel transmission, the reference signal transmission to the UE on the second CC based on the minimum gap.

In some examples of the method, apparatuses, and non-transitory computer-readable medium described herein, the resource associated with the downlink control channel transmission includes an orthogonal frequency division multiplexing (OFDM) symbol of the downlink control channel transmission on the first CC, the resource associated with the reference signal transmission includes an OFDM symbol of the reference signal transmission on the second CC, and the minimum gap may be measured in OFDM symbols of a numerology of the second CC.

In some examples of the method, apparatuses, and non-transitory computer-readable medium described herein, the resource associated with the downlink control channel transmission includes a first slot containing the downlink control channel transmission on the first CC, the resource associated with the reference signal transmission includes a second slot containing the reference signal transmission on the second CC, and the minimum gap may be measured as a number of slots of the second CC, where the minimum gap may be identified based on a location of the downlink control channel transmission within the first slot.

Some examples of the method, apparatuses, and non-transitory computer-readable medium described herein may further include operations, features, means, or instructions for receiving, from the UE, an indication of the minimum gap.

In some examples of the method, apparatuses, and non-transitory computer-readable medium described herein, the minimum gap may be measured with respect to a first or last orthogonal frequency division multiplexing (OFDM) symbol of the downlink control channel transmission relative to a first or last OFDM symbol of the reference signal transmission.

In some examples of the method, apparatuses, and non-transitory computer-readable medium described herein, the indication of the minimum gap may be provided for a set of different combinations numerologies of the first CC and the second CC.

In some examples of the method, apparatuses, and non-transitory computer-readable medium described herein, the minimum gap may be further based on a beam switching gap of the UE.

In some examples of the method, apparatuses, and non-transitory computer-readable medium described herein, the minimum gap may be determined as a sum of an offset between the downlink control channel transmission and the reference signal transmission and the beam switching gap, or based on a maximum value of the offset or the beam switching gap.

In some examples of the method, apparatuses, and non-transitory computer-readable medium described herein, the minimum gap may be identified when the second CC may have a shorter resource duration than the first CC.

In some examples of the method, apparatuses, and non-transitory computer-readable medium described herein, the minimum gap may be determined based on a duration of the downlink control channel transmission and a scaling factor, where the scaling factor may be proportional to a difference in the numerologies of the first CC and the second CC.

In some examples of the method, apparatuses, and non-transitory computer-readable medium described herein, the minimum gap may be identified for each frequency band combination configured for the connection with the base station, for each frequency band pair combination configured for the connection with the base station, or any combinations thereof.

In some examples of the method, apparatuses, and non-transitory computer-readable medium described herein, the base station receives minimum gap information from the UE that indicates minimum gaps for two or more frequency band combinations configured for the connection with the base station, two or more frequency band pair combinations configured for the connection with the base station, one or more frequency band pair combination that may be unsupported by the UE, or any combinations thereof.

Some examples of the method, apparatuses, and non-transitory computer-readable medium described herein may further include operations, features, means, or instructions for receiving, from the UE, one or more measured channel characteristics of the reference signal transmission when the UE is configured for reporting.

A method of wireless communication at a base station is described. The method may include establishing a connection with a UE via at least a first CC and a second CC, where the first CC has a first numerology and associated first slot duration, and the second CC has a second numerology and associated second slot duration that is shorter than the first slot duration, identifying a minimum gap, as a number of slots of the second CC, between a first slot containing a downlink control channel transmission on the first CC and a second slot containing a reference signal transmission on the second CC, where the minimum gap is identified based on a location of the downlink control channel transmission within the first slot, transmitting the downlink control channel transmission via the first CC, and transmitting, responsive to the downlink control channel transmission, the reference signal transmission on the second CC based on the minimum gap.

An apparatus for wireless communication at a base station is described. The apparatus may include a processor, memory coupled with the processor, and instructions stored in the memory. The instructions may be executable by the processor to cause the apparatus to establish a connection with a UE via at least a first CC and a second CC, where the first CC has a first numerology and associated first slot duration, and the second CC has a second numerology and associated second slot duration that is shorter than the first slot duration, identify a minimum gap, as a number of slots of the second CC, between a first slot containing a downlink control channel transmission on the first CC and a second slot containing a reference signal transmission on the second CC, where the minimum gap is identified based on a location of the downlink control channel transmission within the first slot, transmit the downlink control channel transmission via the first CC, and transmit, responsive to the downlink control channel transmission, the reference signal transmission on the second CC based on the minimum gap.

Another apparatus for wireless communication at a base station is described. The apparatus may include means for establishing a connection with a UE via at least a first CC and a second CC, where the first CC has a first numerology and associated first slot duration, and the second CC has a second numerology and associated second slot duration that is shorter than the first slot duration, identifying a minimum gap, as a number of slots of the second CC, between a first slot containing a downlink control channel transmission on the first CC and a second slot containing a reference signal transmission on the second CC, where the minimum gap is identified based on a location of the downlink control channel transmission within the first slot, transmitting the downlink control channel transmission via the first CC, and transmitting, responsive to the downlink control channel transmission, the reference signal transmission on the second CC based on the minimum gap.

A non-transitory computer-readable medium storing code for wireless communication at a base station is described. The code may include instructions executable by a processor to establish a connection with a UE via at least a first CC and a second CC, where the first CC has a first numerology and associated first slot duration, and the second CC has a second numerology and associated second slot duration that is shorter than the first slot duration, identify a minimum gap, as a number of slots of the second CC, between a first slot containing a downlink control channel transmission on the first CC and a second slot containing a reference signal transmission on the second CC, where the minimum gap is identified based on a location of the downlink control channel transmission within the first slot, transmit the downlink control channel transmission via the first CC, and transmit, responsive to the downlink control channel transmission, the reference signal transmission on the second CC based on the minimum gap.

Some examples of the method, apparatuses, and non-transitory computer-readable medium described herein may further include operations, features, means, or instructions for receiving, from the UE, one or more measured channel characteristics of the reference signal transmission when the UE may be configured for reporting.

Some examples of the method, apparatuses, and non-transitory computer-readable medium described herein may further include operations, features, means, or instructions for receiving, from the UE, an indication of the minimum gap.

In some examples of the method, apparatuses, and non-transitory computer-readable medium described herein, the indication of the minimum gap may be provided for a set of different combinations numerologies of the first CC and the second CC.

In some examples of the method, apparatuses, and non-transitory computer-readable medium described herein, the minimum gap may be further based on a beam switching gap of the UE.

In some examples of the method, apparatuses, and non-transitory computer-readable medium described herein, the minimum gap may be determined as a sum of an offset between the first slot and the second slot and the beam switching gap, or based on a maximum value of the offset or beam switching gap.

In some examples of the method, apparatuses, and non-transitory computer-readable medium described herein, the minimum gap may be identified responsive to the second slot duration being shorter than the first slot duration.

In some examples of the method, apparatuses, and non-transitory computer-readable medium described herein, the minimum gap may be identified for each frequency band combination configured for the connection with the base station, for each frequency band pair combination configured for the connection with the base station, or any combinations thereof.

DETAILED DESCRIPTION

Figure 1:
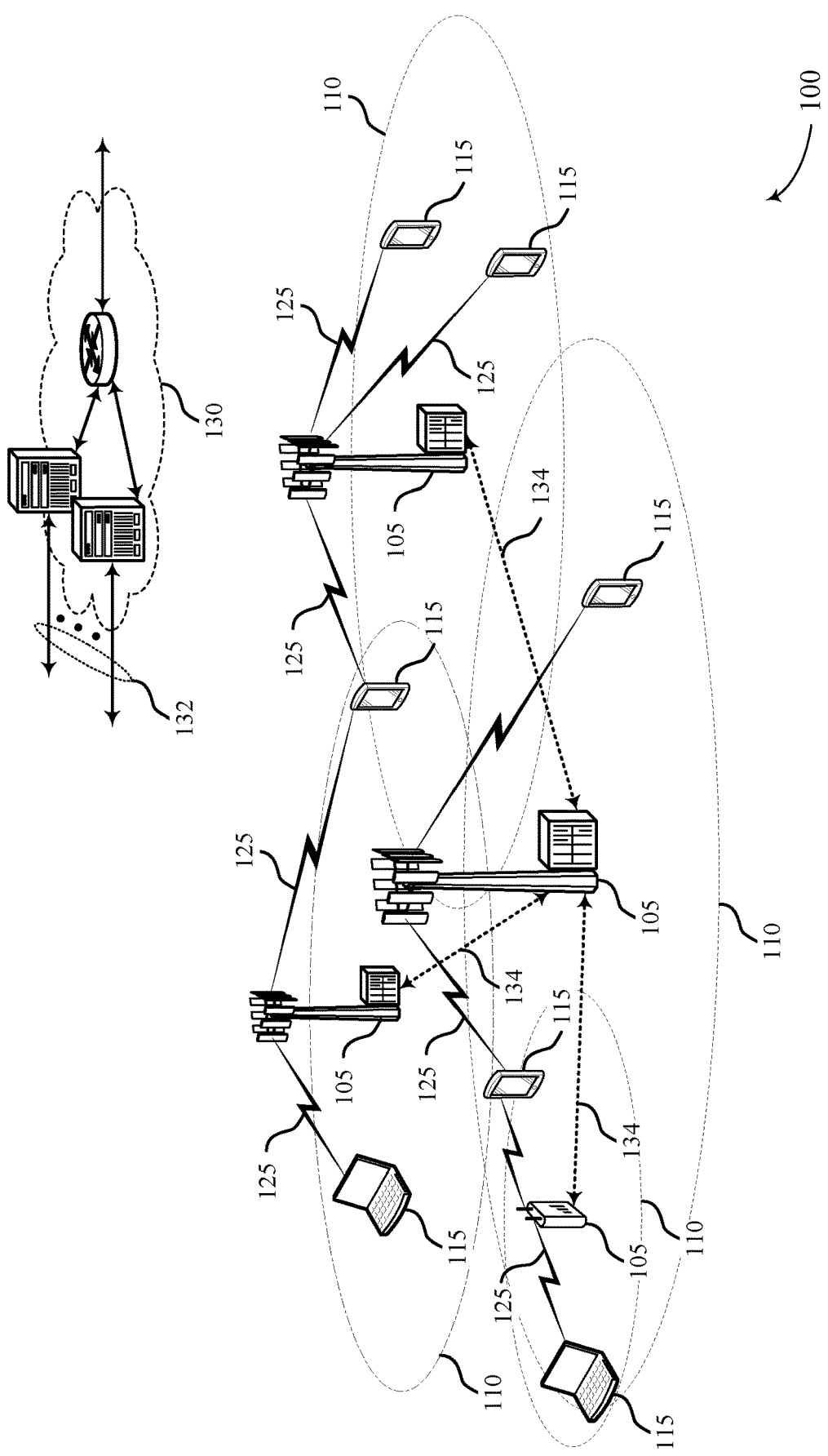
FIG. 1 illustrates an example of a system for wireless communications that supports measurement report triggering techniques for multiple component carriers in accordance with aspects of the present disclosure.

In various aspects, the present disclosure provides techniques for identifying a minimum gap between a control channel transmission on a first component carrier (CC) that triggers a measurement report and an associated reference signal transmission on a second CC. In some cases, the first CC and the second CC may have different numerologies. For example, the first CC may use a 15 kHz sub-carrier spacing (SCS) and have a first orthogonal frequency divisional multiplexing (OFDM) symbol duration, and the second CC may use a 30 kHz SCS and have a second OFDM symbol duration that is half of the first OFDM symbol duration. In some cases other numerologies may be present on or more CCs that may use, for example, 60 kHz or 120 kHz SCSs, and have further reduced OFDM symbol durations.

As indicated above, in some cases a base station may trigger measurement report at a user equipment (UE) through a control channel transmission (e.g., a physical downlink control channel (PDCCH) transmission) on the first CC. Based on the trigger received on the first CC, the UE may identify resources for a reference signal (e.g., a channel state information reference signal (CSI-RS)) on the second CC, and may perform one or more measurements on the reference signal that are reported to the base station. In cases where cross-carrier triggering occurs across CCs that have a different numerology, techniques such as provided herein may allow a UE to measure reference signals without having to buffer substantial portions of transmissions of the CC that contains the reference signal. In such cases where the second CC that contains the reference signal has a higher numerology (i.e., a shorter OFDM symbol duration) than the first CC, sufficient time may be provided for the UE to receive and decode the control channel transmission on the first CC before having to measure the reference signal on the second CC.

For example, if the control channel transmission occupies three OFDM symbols of the first CC, and the UE takes another three OFDM symbols to decode the control channel transmission, a time period of six OFDM symbols at the first CC numerology may elapse prior to the UE being ready to measure the reference signal. In cases where the second CC has a higher numerology than the first CC without a minimum gap defined between a trigger and a reference signal transmission, the UE may need to buffer a relatively large number of symbols of the second CC (e.g., if the first CC has a 15 kHz SCS and the second CC has a 60 kHz SCS, 6 OFDM symbols of the first CC corresponds to 24 OFDM symbols of the second CC). Techniques for providing a minimum gap between a control channel transmission and an associated reference signal transmissions as discussed herein may allow a UE to buffer fewer symbols of the second CC, and may thus enhance UE efficiency and memory usage.

In some cases, the minimum gap is based on an OFDM symbol location of the control channel transmission. In some cases, the first CC and the second CC have different numerologies and the minimum gap is identified in terms of a number of OFDM symbols of the second CC that carries the reference signal transmission. In some cases, a formula may be used to determine the minimum gap according to a PDCCH duration, a time to decode PDCCH, and a scaling factor that is proportional to the difference in numerologies between the first CC and the second CC. In other cases, the minimum gap may be identified based on whether the control channel transmission is provided in a first number of symbols of the first CC (e.g., within the first three OFDM symbols) or may be provided later in a slot of the first CC (e.g., in a last three OFDM symbols in a slot).

Further, in some cases, a UE may perform beam switching between the two CCs, and the minimum gap may be further based at least in part on a beam switch time for performing the beam switching. In some cases, the UE may indicate minimum gap information to the base station, such as in a table that indicates a minimum gap for different combinations of numerologies, a minimum gap for different band-pairs, numerology differences that are unsupported, or any combinations thereof.

Aspects of the disclosure are initially described in the context of a wireless communications system. Examples of measurement report timelines and minimum gap indications are then described. Aspects of the disclosure are further illustrated by and described with reference to apparatus diagrams, system diagrams, and flowcharts that relate to measurement report triggering techniques for multiple component carriers.

FIG. 1 illustrates an example of a wireless communications system 100 that supports measurement report triggering techniques for multiple component carriers in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, UEs 115 and base stations 105 may use multiple CCs that have different numerologies. In such cases, measurement reports (e.g., aperiodic CSI reports) may be triggered by a control channel transmission on a first CC, with a corresponding reference signal transmission on a second CC. UEs 115 and base stations 105, according to various aspects discussed herein, may identify a minimum gap between the control channel transmission on the first CC that triggers the measurement report and an associated reference signal (e.g., a CSI-RS) transmission on a second CC. In some cases, the first CC and the second CC have different numerologies and the minimum gap is identified in terms of a number of OFDM symbols of the second CC that carries the reference signal transmission. In other cases, the minimum gap may be identified based on a location of the control channel transmission within a slot of the first CC. Further, in some cases, a UE 115 may perform beam switching between the two CCs, and the minimum gap may be further based at least in part on a beam switch time for performing the beam switching.

Figure 2:
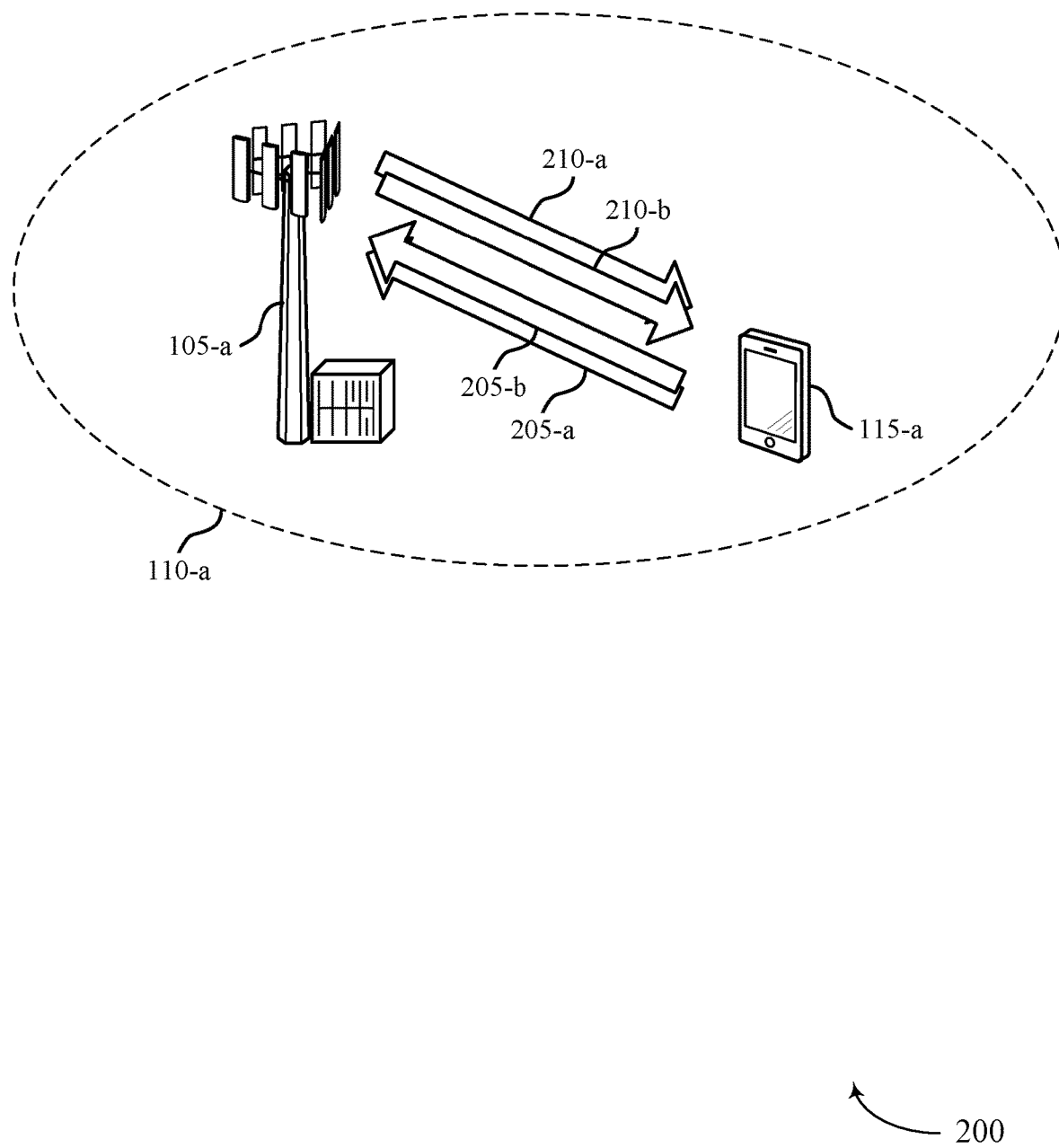
FIG. 2 illustrates an example of a portion of a wireless communications system that supports measurement report triggering techniques for multiple component carriers in accordance with aspects of the present disclosure.

FIG. 2 illustrates an example of a wireless communications system 200 that supports measurement report triggering techniques for multiple component carriers in accordance with aspects of the present disclosure. The wireless communications system 200 may include base station 105-a and UE 115-a, which may be examples of the corresponding devices described with reference to FIG. 1. Base station 105-a may provide network coverage for a geographic coverage area 110-a. The base station 105-a may transmit downlink transmissions via two or more downlink CCs 210 (e.g., first DL CC 210-a and second DL CC 210-b) to the UE 115-a, and the UE 115-a may transmit uplink communications via two or more uplink CCs 205 (e.g., first UL CC 205-a and second UL CC 205-b) to the base station 105-a.

In some cases, different CCs may have different numerologies, and cross-carrier aperiodic measurement report (e.g., aperiodic CSI report) triggering may be used to trigger one or more measurement report transmissions from the UE 115-a. As indicated above, in cases where a reference signal (e.g., a CSI-RS) is transmitted using a CC with a higher numerology than a CC that triggers the measurement report (e.g., a trigger transmitted on the first DL CC 210-a that uses a 15 kHz SCS and a CSI-RS transmitted on the second DL CC 210-b that uses a 30 kHz SCS), a minimum gap may be identified such that the UE 115-a does not need to buffer a relatively large amount of resources such as OFDM symbols of the second DL CC 210-b. An illustration of a timeline for triggering a measurement report, measuring a reference signal, and transmitting the measurement report is illustrated in FIG. 3.

Figure 3:
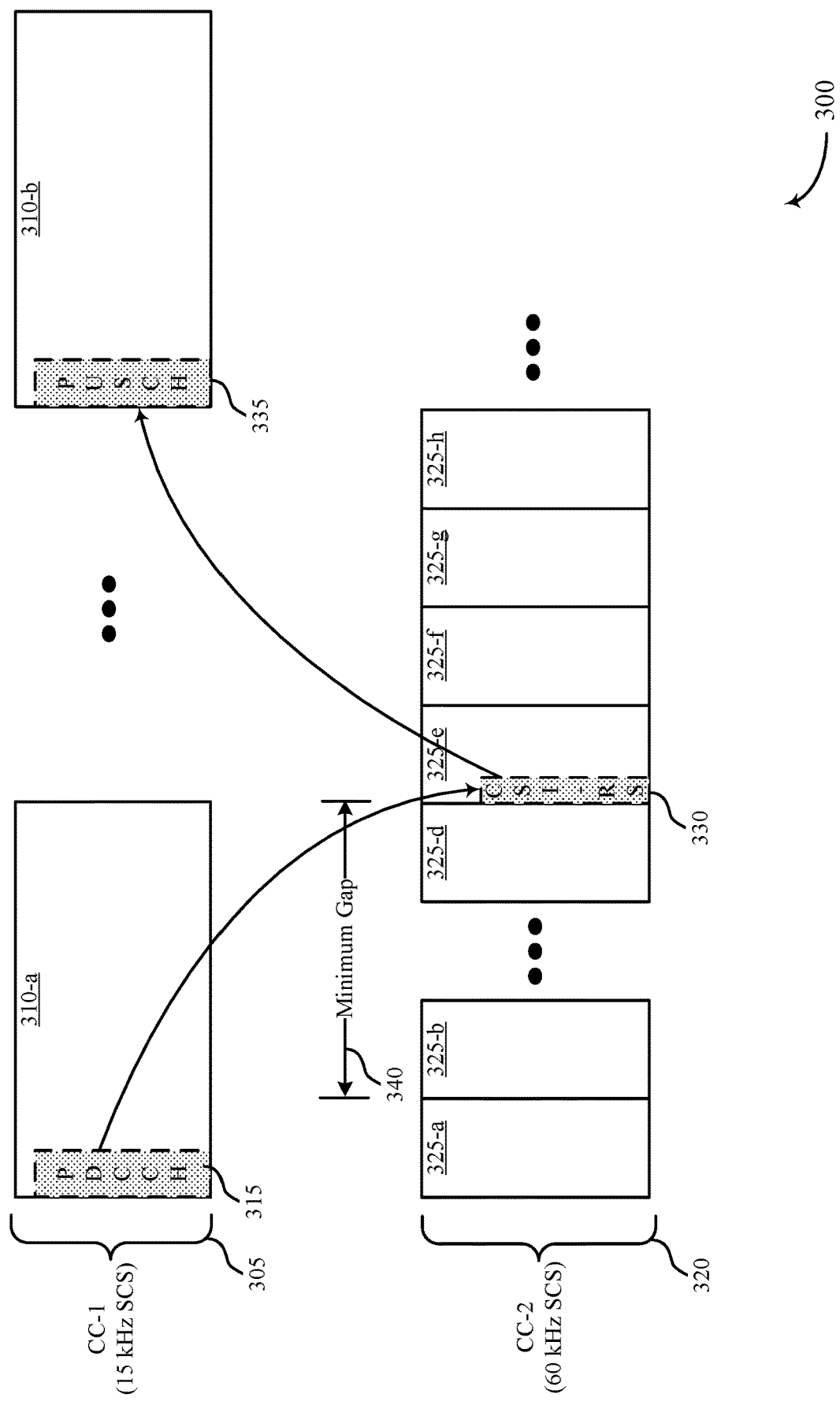
FIG. 3 illustrates an example of a measurement report timeline that supports measurement report triggering techniques for multiple component carriers in accordance with aspects of the present disclosure.

FIG. 3 illustrates an example of a measurement report timeline 300 that supports measurement report triggering techniques for multiple component carriers in accordance with aspects of the present disclosure. In some examples, measurement report timeline 300 may implement aspects of wireless communications system 100 or 200. In this example, a UE (e.g., a UE 115 of FIG. 1 or 2) and a base station (e.g., a base station 105 of FIG. 1 or 2) may establish a connection via two CCs, namely via first CC 305 and second CC 320. In this example, the first CC 305 has a SCS of 15 kHz, and the second CC 320 has a SCS of 60 kHz.

In this example, a number of transmission slots 310 of the first CC 305 are illustrated, along with a number of transmission slots 325 of the second CC 320. Due to the different numerologies of the first CC 305 and the second CC 320, the transmission slots 310 are longer than the transmission slots 325 of the second CC 320, and in this example four slots of the second CC 320 correspond to a single slot 310 of the first CC 305. Each transmission slot may contain a number of OFDM symbols, such as 14 OFDM symbols. Each OFDM symbol of the first CC 305 is likewise four times longer that an OFDM symbol of the second CC 320. While a 15 kHz and 60 kHz SCS example is illustrated in FIG. 3, other SCSs may be present between CCs, and this example is provided for purposes of illustration and discussion only as techniques discussed herein may be applied to CCs having any different numerologies.

In this example, the base station may trigger a measurement report in a PDCCH 315 transmission that is transmitted via the first CC 305. The base station may, in this example, transmit a CSI-RS 330 via the second CC 320. The base station may determine when to transmit the CSI-RS 330, and the UE upon receiving the trigger may determine when to measure the CSI-RS 330, based on a minimum gap 340. In some aspects of the present disclosure, the minimum gap 340 may be defined in a number of symbols of the CSI-RS numerology (i.e., in a number of OFDM symbols of the second CC 320). The minimum gap 340 be a number of OFDM symbols (based on the second CC 320 numerology) between the start of a first (or end of a last) OFDM symbol of the triggering PDCCH 315 and a first (or last) OFDM symbol of CSI-RS 330 occasion. In some cases, the minimum gap 340 may be identified according to an equation that is based on a duration of the PDCCH 315, a time for the UE to decode the PDCCH 315, and a scaling factor between numerologies of the first CC and the second CC. An example of such minimum gap 340 identification could be in the format of a formula as follows:

$$\text{PDCCH}_{duration} \times 2 \times (2^{\mu_{CSIRS} - \mu_{PDCCH}}) \text{ OFDM symbols, if } \mu_{CSIRS} > \mu_{PDCCH},$$
$$0 \text{ OFDM symbols, if } \mu_{CSIRS} \leq \mu_{PDCCH},$$

where $\mu=0$ for 15 kHz SCS, $\mu=1$ for 30 kHz SCS, $\mu=2$ for 60 kHz SCS, and $\mu=3$ for 120 kHz SCS.

Figure 4:
FIG. 4 illustrates an example of a minimum gap indication table that supports measurement report triggering techniques for multiple component carriers in accordance with aspects of the present disclosure.

In some cases, the UE and base station may determine the minimum gap 340 and may operate in accordance with the determination. In other cases, UE may report the minimum gap 340 for multiple different combinations of numerologies to the base station, such as in a table format that indicates the possible transitions, such as illustrated in the table of FIG. 4. The UE may transmit the measurement report to the base station in a physical uplink shared channel (PUSCH) 335 transmission to the base station on the first CC 305.

FIG. 4 illustrates an example of a minimum gap indication table 400 that supports measurement report triggering techniques for multiple component carriers in accordance with aspects of the present disclosure. In some examples, minimum gap indication table 400 may implement aspects of wireless communications system 100 or 200. As discussed with reference to FIG. 3, in some cases, a UE may report the minimum gap for multiple different combinations of numerologies to the base station, such as in minimum gap indication table 400 that indicates the possible transitions and the associated minimum gap. In some cases, the minimum gap indication table 400 may be signalized to the base station in RRC signaling during a connection establishment procedure that establishes the first CC and the second CC. In cases where more than two CCs are established, such a table or determination of the minimum gap may be applied to the CC that triggers the CSI report and the CC that carries the CSI-RS.

In some cases, the UE may provide an indication of a UE capability for reporting minimum gaps as part of a UE capability report. Further, in some cases, such numbers may be reported independently for each band in the band combinations (e.g., for a 30 kHz SCS to 60 kHz SCS transition between CCs, for a 30 kHz SCS to 120 kHz SCS transition, etc.). Additionally or alternatively, such numbers may be reported independently for each band-pair in a band combination (e.g., a first gap value may be reported for a 30 kHz SCS to 60 kHz SCS transition and a second gap value may be reported for a 30 kHz SCS to 120 kHz SCS transition). Further, in some cases a UE may indicate one or more transitions that are unsupported by the UE (e.g., that the UE does not support a 15 kHz SCS to 120 kHz SCS transition between CCs).

Figure 5:
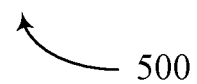
FIG. 5 illustrates an example of a minimum gap indication table that supports measurement report triggering techniques for multiple component carriers in accordance with aspects of the present disclosure.

In some cases, the UE, base station, or both, may also include a beam switch duration when identifying the minimum gap. FIG. 5 illustrates an example of a minimum gap indication table 500 that incorporates beam switch duration in accordance with aspects of the present disclosure. In some examples, minimum gap indication table 500 may implement aspects of wireless communications system 100 or 200. In this example, the minimum gap may be identified in a similar manner as discussed with respect to FIGS. 3 and 4, and may further take into account a switching time to switch beams between CCs.

In some examples, such minimum gaps may be determined in accordance with a formula that accounts for a PDCCH duration, a decoding time at the UE, a scaling factor based on the different numerologies of the CCs, and a beam switch time. For example, minimum gap values may be in the format of a formula as follows:

$$PDCCH_{duration} \times 2 \times (2^{\mu_{CSIRS} - \mu_{PDCCH}}) + \text{Beam-Switching-minimum-requirement OFDM symbols, if } \mu_{CSIRS} > \mu_{PDCCH}$$

0 OFDM symbols, otherwise, where μ is defined as discussed with respect to FIG. 3. Further, in some cases, the minimum gap may be determined as a sum of an offset between the downlink control channel transmission and the reference signal transmission and the beam switching gap, or based on a maximum value of the offset or beam switching gap.

Figure 6:
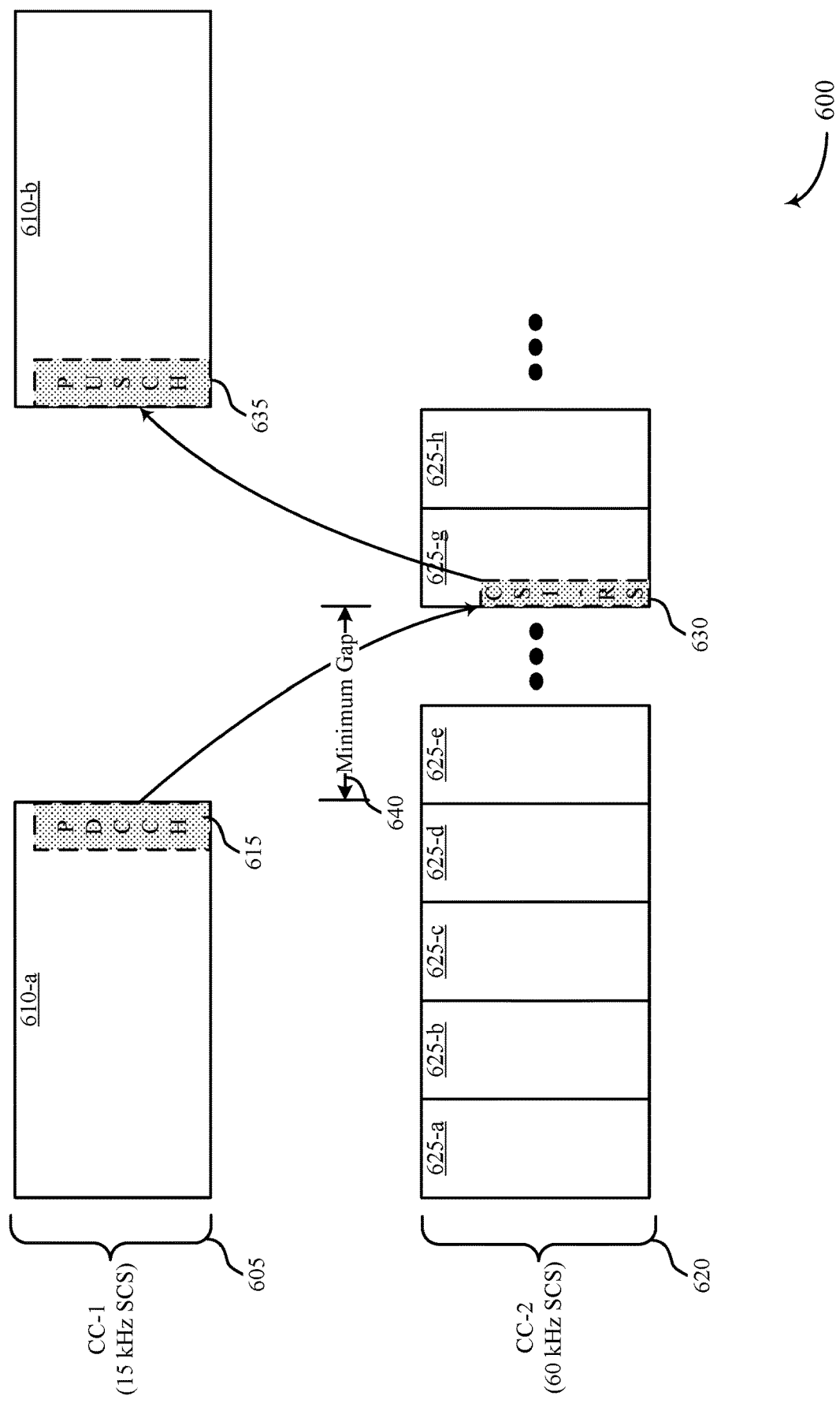
FIG. 6 illustrates an example of a measurement report timeline that supports measurement report triggering techniques for multiple component carriers in accordance with aspects of the present disclosure.

FIG. 6 illustrates another example of a measurement report timeline 600 that supports measurement report triggering techniques for multiple component carriers in accordance with aspects of the present disclosure. In some examples, measurement report timeline 600 may implement aspects of wireless communications system 100 or 200. In this example, a minimum gap may be identified based on a slot that contains the PDCCH and a position of the PDCCH within the slot, with a slot offset, X, provided as the minimum gap. In this example, a UE (e.g., a UE 115 of FIG. 1 or 2) and a base station (e.g., a base station 105 of FIG. 1 or 2) may establish a connection via two CCs, namely via first CC 605 and second CC 620. In this example, the first CC 605 has a SCS of 15 kHz, and the second CC 620 has a SCS of 60 kHz.

In this example, a number of transmission slots 610 of the first CC 605 are illustrated, along with a number of transmission slots 625 of the second CC 620. Due to the different numerologies of the first CC 605 and the second CC 620, the transmission slots 610 are longer than the transmission slots 625 of the second CC 620, and in this example four slots of the second CC 620 correspond to a single slot 610 of the first CC 605. Each transmission slot may contain a number of OFDM symbols, such as 14 OFDM symbols. Each OFDM symbol of the first CC 605 is likewise four times longer that an OFDM symbol of the second CC 620. While a 15 kHz and 60 kHz SCS example is illustrated in FIG. 6, other SCSs may be present between CCs, and this example is provided for purposes of illustration and discussion only as techniques discussed herein may be applied to CCs having any different numerologies.

In this example, the base station may trigger a measurement report in a PDCCH transmission 615 that is transmitted via the first CC 605 at the end of a first slot 610-*a*. The base station may, in this example, transmit a CSI-RS 630 via the second CC 620. The base station may determine when to transmit the CSI-RS 630, and the UE upon receiving the trigger may determine when to measure the CSI-RS 630, based on a minimum gap 640. In some aspects of the present disclosure, the minimum gap 640 may be defined based on a position of the PDCCH 615 in the first slot 610-*a*. The UE may transmit the measurement report to the base station in a PUSCH 635 transmission to the base station on the first CC 605. In some cases, a default minimum gap may be defined based on the PDCCH 615 occurring within a first number of OFDM symbols of the first slot 610-*a*, and in the event that PDCCH 615 occurs later within the slot 610-*a*, such as illustrated in FIG. 6, a larger minimum gap may be identified. In other examples, the cross-CC measurement report scheduling may be performed by the base station only in cases where the triggering PDCCH is present within the initial number of OFDM symbols within the slot, or the minimum gap may be determined based on a worst-case assumption that the triggering PDCCH is located at the end of the slot.

In further examples, such as illustrated in FIG. 6, techniques may split the scenarios of PDCCH 615 only in first symbols of a slot 610-*a* from scenarios of PDCCH 615 anywhere in the slot 610-*a*. For the scenario of PDCCH only in the initial symbols (e.g., within the first 3 symbols of first slot 610-*a*), a slot offset, X, may be defined where X≥1. In other cases, the slot offset, X, may be defined as X≥1 for the cases without beam switching involved, otherwise it is X≥1+Beam switching minimum requirement, or X≥max(1, Beam switching minimum requirement).

Figure 7:
FIG. 7 illustrates an example of a minimum gap indication table that supports measurement report triggering techniques for multiple component carriers in accordance with aspects of the present disclosure.

Otherwise, for the scenario of PDCCH 615 occurring later in the first slot 610-*a* a table such as illustrated in FIG. 7 may be used to identify the minimum gap 640. FIG. 7 illustrates an example of a minimum gap indication table 700 that supports measurement report triggering techniques for multiple component carriers in accordance with aspects of the present disclosure. In cases where the UE uses beam switching to switch between CCs, the table 700 may be used when no beam switching is used, and otherwise an additional slot offset may be added when beam switching is used. In some cases, the minimum slot offset may be defined as X≥1+ Beam switching minimum requirement, or X≥max(1, Beam switching minimum requirement).

Figure 8:
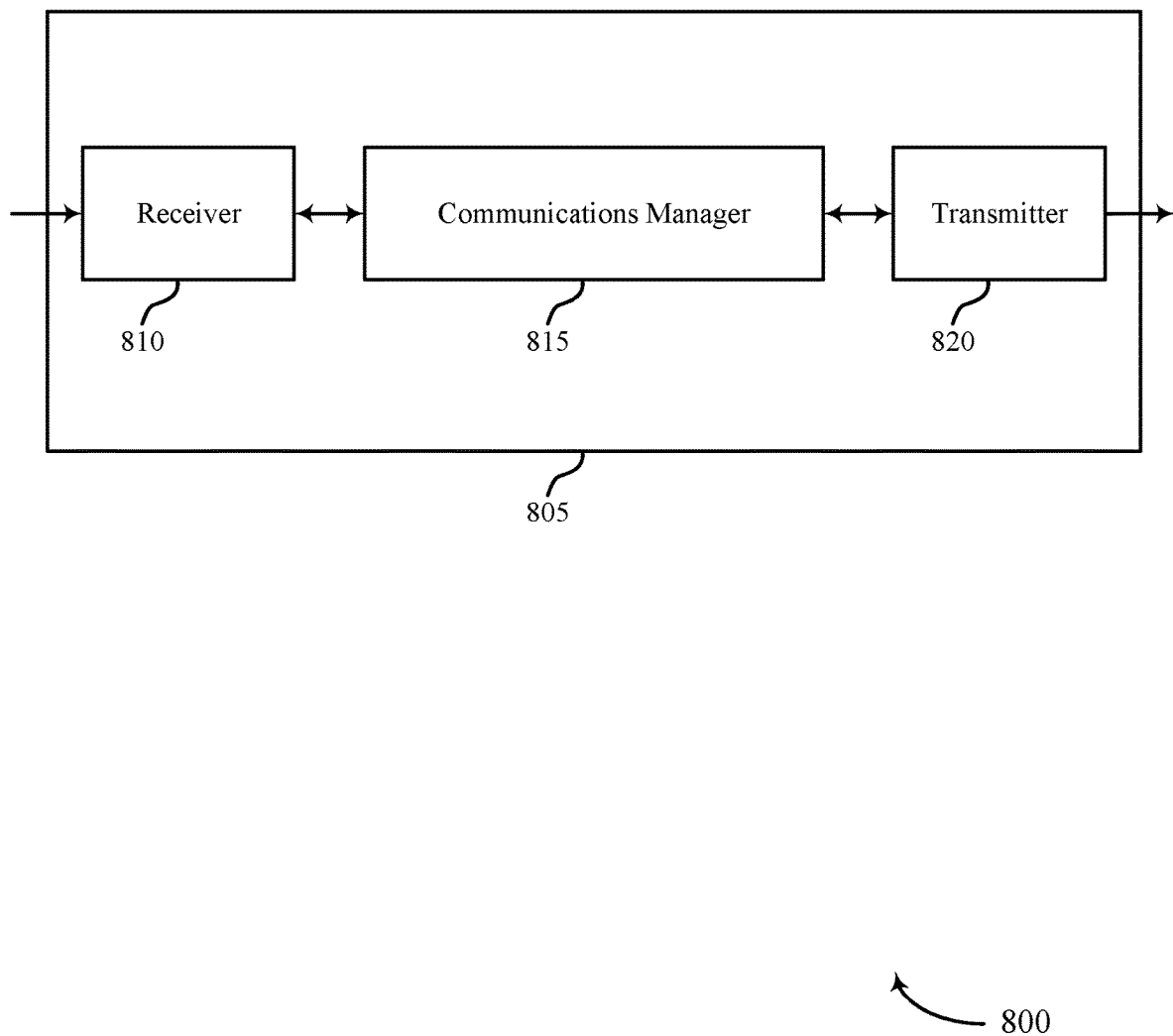
FIGS. 8 and 9 show block diagrams of devices that support measurement report triggering techniques for multiple component carriers in accordance with aspects of the present disclosure.

FIG. 8 shows a block diagram 800 of a device 805 that supports measurement report triggering techniques for multiple component carriers in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to measurement report triggering techniques for multiple component carriers, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may establish a connection with a base station via at least a first CC and a second CC, where the first CC has a different numerology than the second CC, identify a minimum gap between a resource associated with a downlink control channel transmission on the first CC and a resource associated with a reference signal transmission on the second CC, receive the downlink control channel transmission via the first CC, receive, responsive to the downlink control channel transmission, the reference signal transmission on the second CC based on the minimum gap, and report one or more measured channel characteristics of the reference signal transmission to the base station.

The communications manager 815 may also establish a connection with a base station via at least a first CC and a second CC, where the first CC has a first numerology and associated first slot duration, and the second CC has a second numerology and associated second slot duration that is shorter than the first slot duration, identify a minimum gap, as a number of slots of the second CC, between a first slot containing a downlink control channel transmission on the first CC and a second slot containing a reference signal transmission on the second CC, where the minimum gap is identified based on a location of the downlink control channel transmission within the first slot, receive the downlink control channel transmission via the first CC, receive, responsive to the downlink control channel transmission, the reference signal transmission on the second CC based on the minimum gap, and report one or more measured channel characteristics of the reference signal transmission to the base station. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
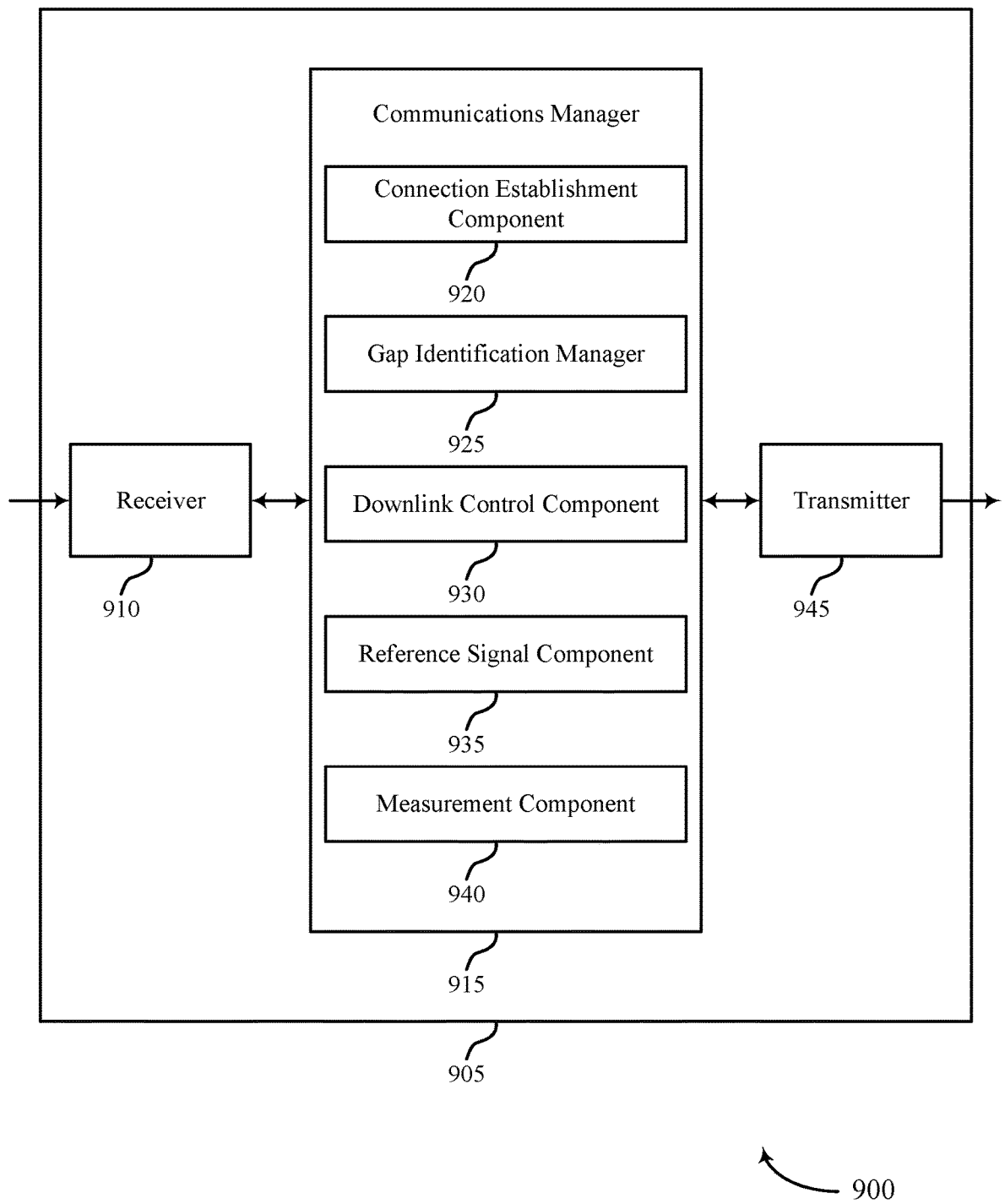

FIG. 9 shows a block diagram 900 of a device 905 that supports measurement report triggering techniques for multiple component carriers in accordance with aspects of the present disclosure. The device 905 may be an example of aspects of a device 805, or a UE 115 as described herein. The device 905 may include a receiver 910, a communications manager 915, and a transmitter 945. The device 905 may also include a processor. Each of these components may be in communication with one another (e.g., via one or more buses).

The receiver 910 may receive information such as packets, user data, or control information associated with various information channels (e.g., control channels, data channels, and information related to measurement report triggering techniques for multiple component carriers, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a connection establishment component 920, a gap identification manager 925, a downlink control component 930, a reference signal component 935, and a measurement component 940. The communications manager 915 may be an example of aspects of the communications manager 1110 described herein.

The connection establishment component 920 may establish a connection with a base station via at least a first CC and a second CC, where the first CC has a different numerology than the second CC.

The gap identification manager 925 may identify a minimum gap between a resource (e.g., an OFDM symbol) associated with a downlink control channel transmission on the first CC and a resource associated with a reference signal transmission on the second CC. In some cases, the gap identification manager 925 may identify a minimum gap, as a number of slots of the second CC, between a first slot containing a downlink control channel transmission on the first CC and a second slot containing a reference signal transmission on the second CC, where the minimum gap is identified based on a location of the downlink control channel transmission within the first slot.

The downlink control component 930 may receive the downlink control channel transmission via the first CC.

The reference signal component 935 may receive, responsive to the downlink control channel transmission, the reference signal transmission on the second CC based on the minimum gap.

The measurement component 940 may report one or more measured channel characteristics of the reference signal transmission to the base station.

The transmitter 945 may transmit signals generated by other components of the device 905. In some examples, the transmitter 945 may be collocated with a receiver 910 in a transceiver module. For example, the transmitter 945 may be an example of aspects of the transceiver 1120 described with reference to FIG. 11. The transmitter 945 may utilize a single antenna or a set of antennas.

Figure 10:
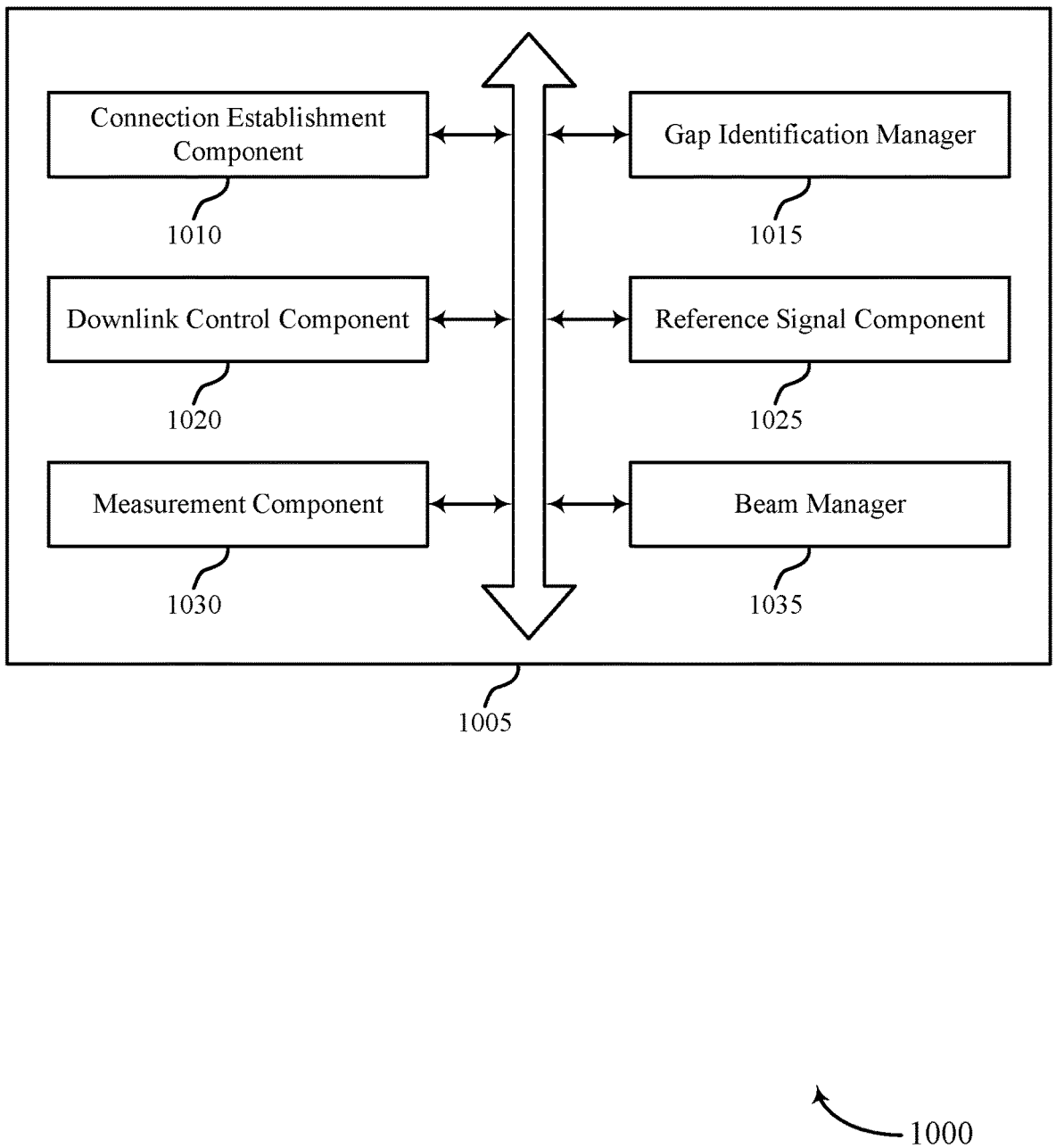
FIG. 10 shows a block diagram of a communications manager that supports measurement report triggering techniques for multiple component carriers in accordance with aspects of the present disclosure.

FIG. 10 shows a block diagram 1000 of a communications manager 1005 that supports measurement report triggering techniques for multiple component carriers in accordance with aspects of the present disclosure. The communications manager 1005 may be an example of aspects of a communications manager 815, a communications manager 915, or a communications manager 1110 described herein. The communications manager 1005 may include a connection establishment component 1010, a gap identification manager 1015, a downlink control component 1020, a reference signal component 1025, a measurement component 1030, and a beam manager 1035. Each of these modules may communicate, directly or indirectly, with one another (e.g., via one or more buses).

The connection establishment component 1010 may establish a connection with a base station via at least a first CC and a second CC, where the first CC has a different numerology than the second CC. In some examples, the connection establishment component 1010 may establish a connection with a base station via at least a first CC and a second CC, where the first CC has a first numerology and associated first slot duration, and the second CC has a second numerology and associated second slot duration that is shorter than the first slot duration.

The gap identification manager 1015 may identify a minimum gap between a resource associated with a downlink control channel transmission on the first CC and a resource associated with a reference signal transmission on the second CC. In some examples, the resource associated with the downlink control channel transmission includes an OFDM symbol of the downlink control channel transmission on the first CC, the resource associated with the reference signal transmission includes an OFDM symbol of the reference signal transmission on the second CC, and the minimum gap is measured in OFDM symbols of a numerology of the second CC. In some examples, the resource associated with the downlink control channel transmission includes a first slot containing the downlink control channel transmission on the first CC, the resource associated with the reference signal transmission includes a second slot containing the reference signal transmission on the second CC, and the minimum gap is measured as a number of slots of the second CC, where the minimum gap is identified based at least in part on a location of the downlink control channel transmission within the first slot.

In some examples, the gap identification manager 1015 may identify a minimum gap, as a number of slots of the second CC, between a first slot containing a downlink control channel transmission on the first CC and a second slot containing a reference signal transmission on the second CC, where the minimum gap is identified based on a location of the downlink control channel transmission within the first slot.

In some examples, the gap identification manager 1015 may transmit an indication of the minimum gap to the base station. In some examples, the minimum gap is measured with respect to a first or last OFDM symbol of the downlink control channel transmission relative to a first or last OFDM symbol of the reference signal transmission. In some cases, the indication of the minimum gap is provided for a set of different combinations numerologies of the first CC and the second CC. In some cases, the minimum gap is identified when the second CC has a shorter resource duration than the first CC (e.g., a shorter OFDM symbol duration or a shorter slot duration).

In some cases, the minimum gap is determined based on a duration of the downlink control channel transmission and a scaling factor, where the scaling factor is proportional to a difference in the numerologies of the first CC and the second CC. In some cases, the minimum gap is provided for each frequency band combination configured for the connection with the base station, for each frequency band pair combination configured for the connection with the base station, or any combinations thereof. In some cases, the UE transmits minimum gap information to the base station that indicates minimum gaps for two or more frequency band combinations configured for the connection with the base station, two or more frequency band pair combinations configured for the connection with the base station, one or more frequency band pair combination that is unsupported by the UE, or any combinations thereof.

The downlink control component 1020 may receive the downlink control channel transmission via the first CC.

In some examples, the reference signal component 1025 may receive, responsive to the downlink control channel transmission, the reference signal transmission on the second CC based on the minimum gap.

The measurement component 1030 may report one or more measured channel characteristics of the reference signal transmission to the base station.

The beam manager 1035 may identify beam switching is to be used, and determine a beam switch time or gap of the UE. In some cases, the minimum gap is further based on a beam switching gap of the UE. In some cases, the minimum gap is determined as a sum of an offset between the downlink control channel transmission and the reference signal transmission and the beam switching gap, or based on a maximum value of the offset or the beam switching gap.

Figure 11:
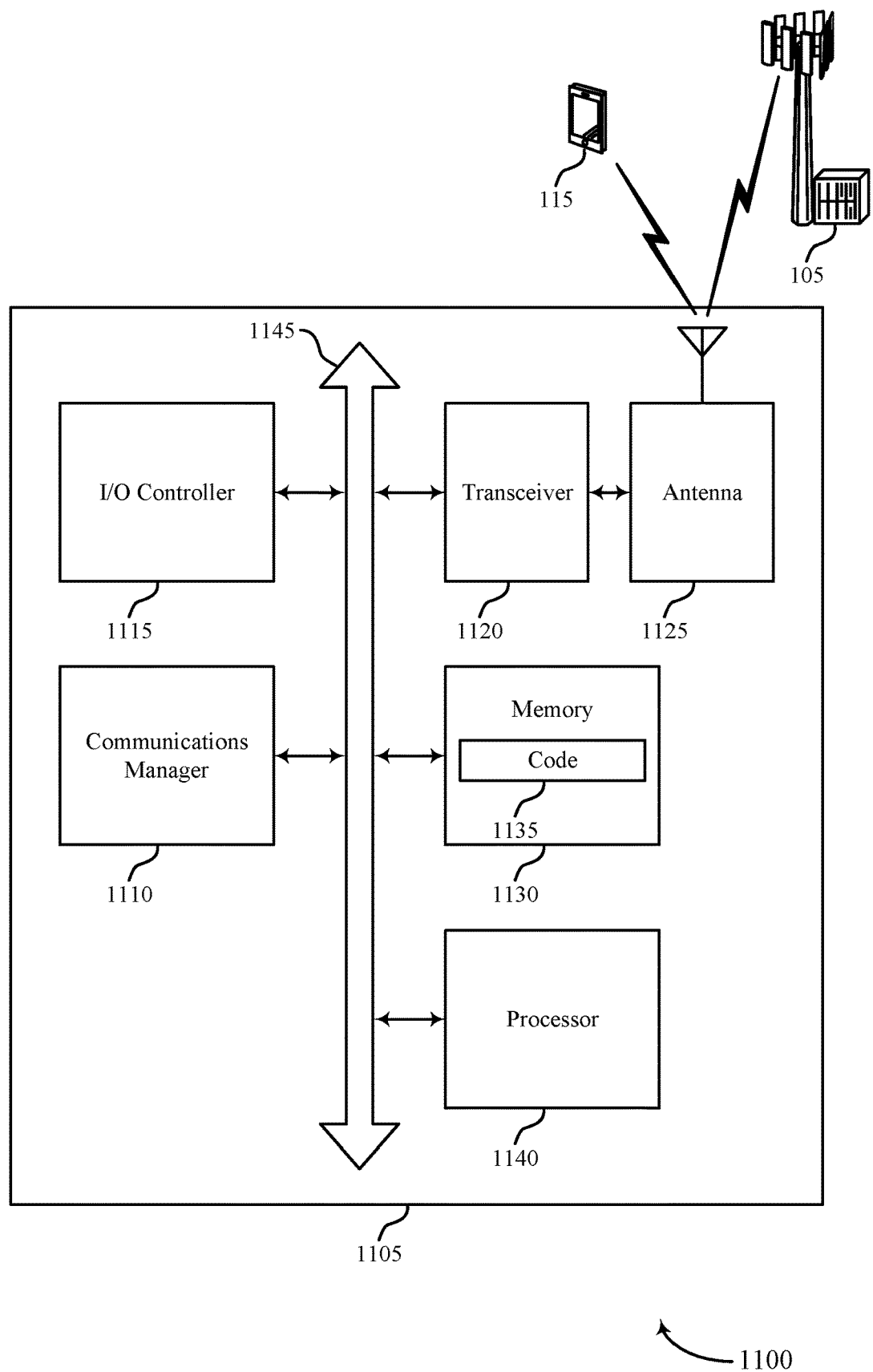
FIG. 11 shows a diagram of a system including a device that supports measurement report triggering techniques for multiple component carriers in accordance with aspects of the present disclosure.

FIG. 11 shows a diagram of a system 1100 including a device 1105 that supports measurement report triggering techniques for multiple component carriers in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may establish a connection with a base station via at least a first CC and a second CC, where the first CC has a different numerology than the second CC, identify a minimum gap between a resource associated with a downlink control channel transmission on the first CC and a resource associated with a reference signal transmission on the second CC, receive the downlink control channel transmission via the first CC, receive, responsive to the downlink control channel transmission, the reference signal transmission on the second CC based on the minimum gap, and report one or more measured channel characteristics of the reference signal transmission to the base station.

The communications manager 1110 may also establish a connection with a base station via at least a first CC and a second CC, where the first CC has a first numerology and associated first slot duration, and the second CC has a second numerology and associated second slot duration that is shorter than the first slot duration, identify a minimum gap, as a number of slots of the second CC, between a first slot containing a downlink control channel transmission on the first CC and a second slot containing a reference signal transmission on the second CC, where the minimum gap is identified based on a location of the downlink control channel transmission within the first slot, receive the downlink control channel transmission via the first CC, receive, responsive to the downlink control channel transmission, the reference signal transmission on the second CC based on the minimum gap, and report one or more measured channel characteristics of the reference signal transmission to the base station.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random access memory (RAM) and read only memory (ROM). The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting measurement report triggering techniques for multiple component carriers).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
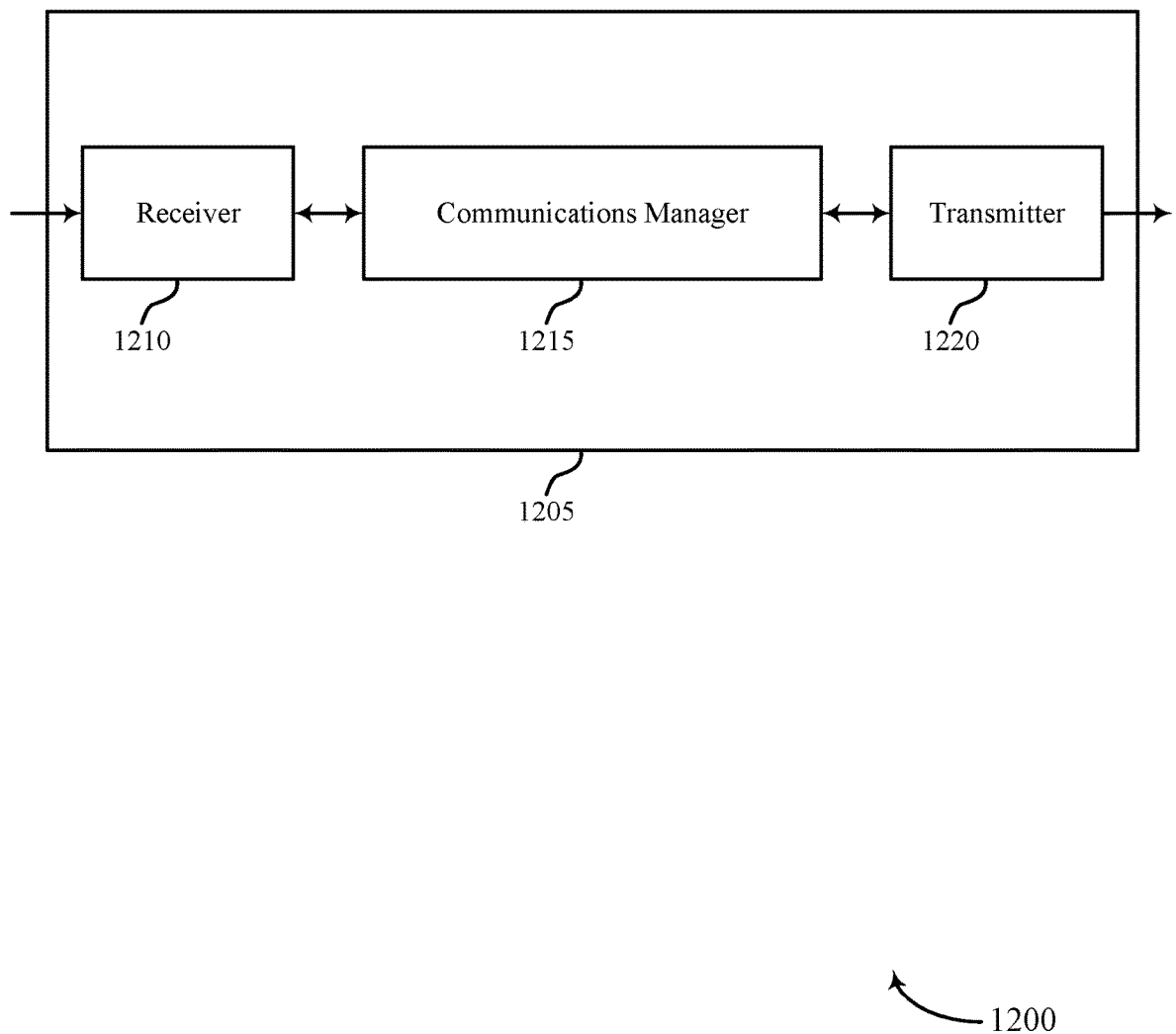
FIGS. 12 and 13 show block diagrams of devices that support measurement report triggering techniques for multiple component carriers in accordance with aspects of the present disclosure.

FIG. 12 shows a block diagram 1200 of a device 1205 that supports measurement report triggering techniques for multiple component carriers in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to measurement report triggering techniques for multiple component carriers, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may establish a connection with a UE via at least a first CC and a second CC, where the first CC has a different numerology than the second CC, identify a minimum gap between a resource associated with a downlink control channel transmission on the first CC and a resource associated with a reference signal transmission on the second CC, transmit the downlink control channel transmission to the UE via the first CC, transmit, responsive to the downlink control channel transmission, the reference signal transmission to the UE on the second CC based on the minimum gap, and receive, from the UE, one or more measured channel characteristics of the reference signal transmission.

The communications manager 1215 may also establish a connection with a UE via at least a first CC and a second CC, where the first CC has a first numerology and associated first slot duration, and the second CC has a second numerology and associated second slot duration that is shorter than the first slot duration, identify a minimum gap, as a number of slots of the second CC, between a first slot containing a downlink control channel transmission on the first CC and a second slot containing a reference signal transmission on the second CC, where the minimum gap is identified based on a location of the downlink control channel transmission within the first slot, transmit the downlink control channel transmission via the first CC, transmit, responsive to the downlink control channel transmission, the reference signal transmission on the second CC based on the minimum gap, and receive, from the UE, one or more measured channel characteristics of the reference signal transmission. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
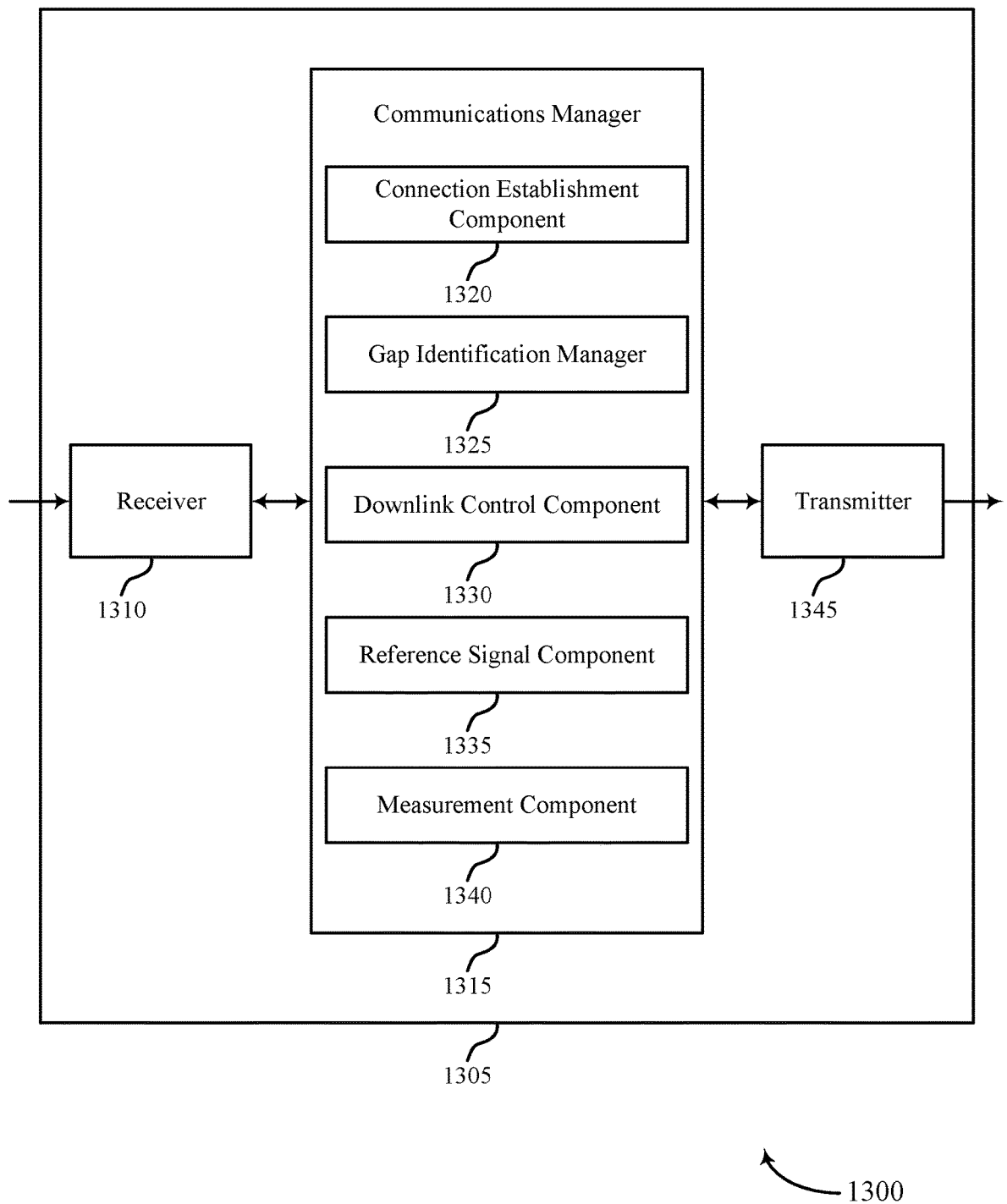

FIG. 13 shows a block diagram 1300 of a device 1305 that supports measurement report triggering techniques for multiple component carriers in accordance with aspects of the present disclosure. The device 1305 may be an example of aspects of a device 1205, or a base station 105 as described herein. The device 1305 may include a receiver 1310, a communications manager 1315, and a transmitter 1345. The device 1305 may also include a processor. Each of these components may be in communication with one another (e.g., via one or more buses).

The receiver 1310 may receive information such as packets, user data, or control information associated with various information channels (e.g., control channels, data channels, and information related to measurement report triggering techniques for multiple component carriers, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a connection establishment component 1320, a gap identification manager 1325, a downlink control component 1330, a reference signal component 1335, and a measurement component 1340. The communications manager 1315 may be an example of aspects of the communications manager 1510 described herein.

The connection establishment component 1320 may establish a connection with a UE via at least a first CC and a second CC, where the first CC has a different numerology than the second CC. In some cases, the first CC has a first numerology and associated first slot duration, and the second CC has a second numerology and associated second slot duration that is shorter than the first slot duration.

The gap identification manager 1325 may identify a minimum gap between a resource associated with a downlink control channel transmission on the first CC and a resource associated with a reference signal transmission on the second CC.

In some cases, the gap identification manager 1325 may identify a minimum gap, as a number of slots of the second CC, between a first slot containing a downlink control channel transmission on the first CC and a second slot containing a reference signal transmission on the second CC, where the minimum gap is identified based on a location of the downlink control channel transmission within the first slot.

The downlink control component 1330 may transmit the downlink control channel transmission to the UE via the first CC.

The reference signal component 1335 may transmit, responsive to the downlink control channel transmission, the reference signal transmission to the UE on the second CC based on the minimum gap.

The measurement component 1340 may receive, from the UE, one or more measured channel characteristics of the reference signal transmission.

The transmitter 1345 may transmit signals generated by other components of the device 1305. In some examples, the transmitter 1345 may be collocated with a receiver 1310 in a transceiver module. For example, the transmitter 1345 may be an example of aspects of the transceiver 1520 described with reference to FIG. 15. The transmitter 1345 may utilize a single antenna or a set of antennas.

Figure 14:
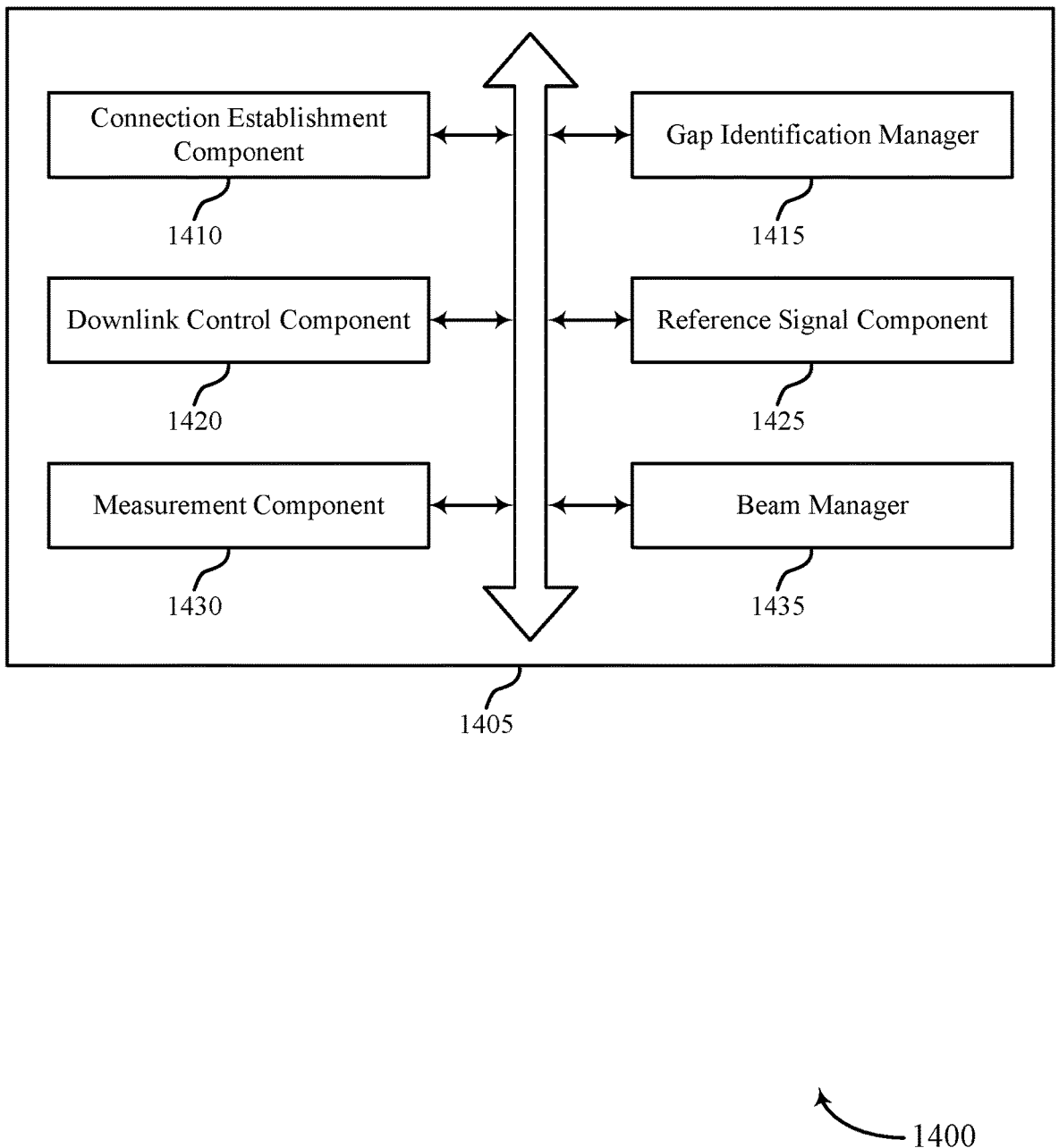
FIG. 14 shows a block diagram of a communications manager that supports measurement report triggering techniques for multiple component carriers in accordance with aspects of the present disclosure.

FIG. 14 shows a block diagram 1400 of a communications manager 1405 that supports measurement report triggering techniques for multiple component carriers in accordance with aspects of the present disclosure. The communications manager 1405 may be an example of aspects of a communications manager 1215, a communications manager 1315, or a communications manager 1510 described herein. The communications manager 1405 may include a connection establishment component 1410, a gap identification manager 1415, a downlink control component 1420, a reference signal component 1425, a measurement component 1430, and a beam manager 1435. Each of these modules may communicate, directly or indirectly, with one another (e.g., via one or more buses).

The connection establishment component 1410 may establish a connection with a UE via at least a first CC and a second CC, where the first CC has a different numerology than the second CC.

In some examples, the connection establishment component 1410 may establish a connection with a UE via at least a first CC and a second CC, where the first CC has a first numerology and associated first slot duration, and the second CC has a second numerology and associated second slot duration that is shorter than the first slot duration.

The gap identification manager 1415 may identify a minimum gap between a resource associated with a downlink control channel transmission on the first CC and a resource associated with a reference signal transmission on the second CC. In some examples, the resource associated with the downlink control channel transmission includes an OFDM symbol of the downlink control channel transmission on the first CC, the resource associated with the reference signal transmission includes an OFDM symbol of the reference signal transmission on the second CC, and the minimum gap is measured in OFDM symbols of a numerology of the second CC. In some examples, the resource associated with the downlink control channel transmission includes a first slot containing the downlink control channel transmission on the first CC, the resource associated with the reference signal transmission includes a second slot containing the reference signal transmission on the second CC, and the minimum gap is measured as a number of slots of the second CC, where the minimum gap is identified based at least in part on a location of the downlink control channel transmission within the first slot.

In some examples, the gap identification manager 1415 may identify a minimum gap, as a number of slots of the second CC, between a first slot containing a downlink control channel transmission on the first CC and a second slot containing a reference signal transmission on the second CC, where the minimum gap is identified based on a location of the downlink control channel transmission within the first slot.

In some examples, the gap identification manager 1415 may receive, from the UE, an indication of the minimum gap. In some examples, the minimum gap is measured with respect to a first or last OFDM symbol of the downlink control channel transmission relative to a first or last OFDM symbol of the reference signal transmission. In some cases, the indication of the minimum gap is provided for a set of different combinations numerologies of the first CC and the second CC. In some cases, the minimum gap is identified when the second CC has a shorter resource duration (e.g., a shorter OFDM symbol duration or a shorter slot duration) than the first CC. In some cases, the minimum gap is determined based on a duration of the downlink control channel transmission and a scaling factor, where the scaling factor is proportional to a difference in the numerologies of the first CC and the second CC.

In some cases, the minimum gap is identified for each frequency band combination configured for the connection with the base station, for each frequency band pair combination configured for the connection with the base station, or any combinations thereof. In some cases, the base station receives minimum gap information from the UE that indicates minimum gaps for two or more frequency band combinations configured for the connection with the base station, two or more frequency band pair combinations configured for the connection with the base station, one or more frequency band pair combination that is unsupported by the UE, or any combinations thereof. In some cases, the indication of the minimum gap is provided for a set of different combinations numerologies of the first CC and the second CC. In some cases, the minimum gap is identified responsive to the second slot duration being shorter than the first slot duration.

The downlink control component 1420 may transmit the downlink control channel transmission to the UE via the first CC. In some examples, the downlink control component 1420 may transmit the downlink control channel transmission via the first CC.

The reference signal component 1425 may transmit, responsive to the downlink control channel transmission, the reference signal transmission to the UE on the second CC based on the minimum gap.

The measurement component 1430 may receive, from the UE, one or more measured channel characteristics of the reference signal transmission.

The beam manager 1435 may identify beam switch times of the UE and identify CCs that require a beam switch. In some cases, the minimum gap is further based on a beam switching gap of the UE. In some cases, the minimum gap is determined as a sum of an offset between the downlink control channel transmission and the reference signal transmission and the beam switching gap, or based on a maximum value of the offset or beam switching gap.

Figure 15:
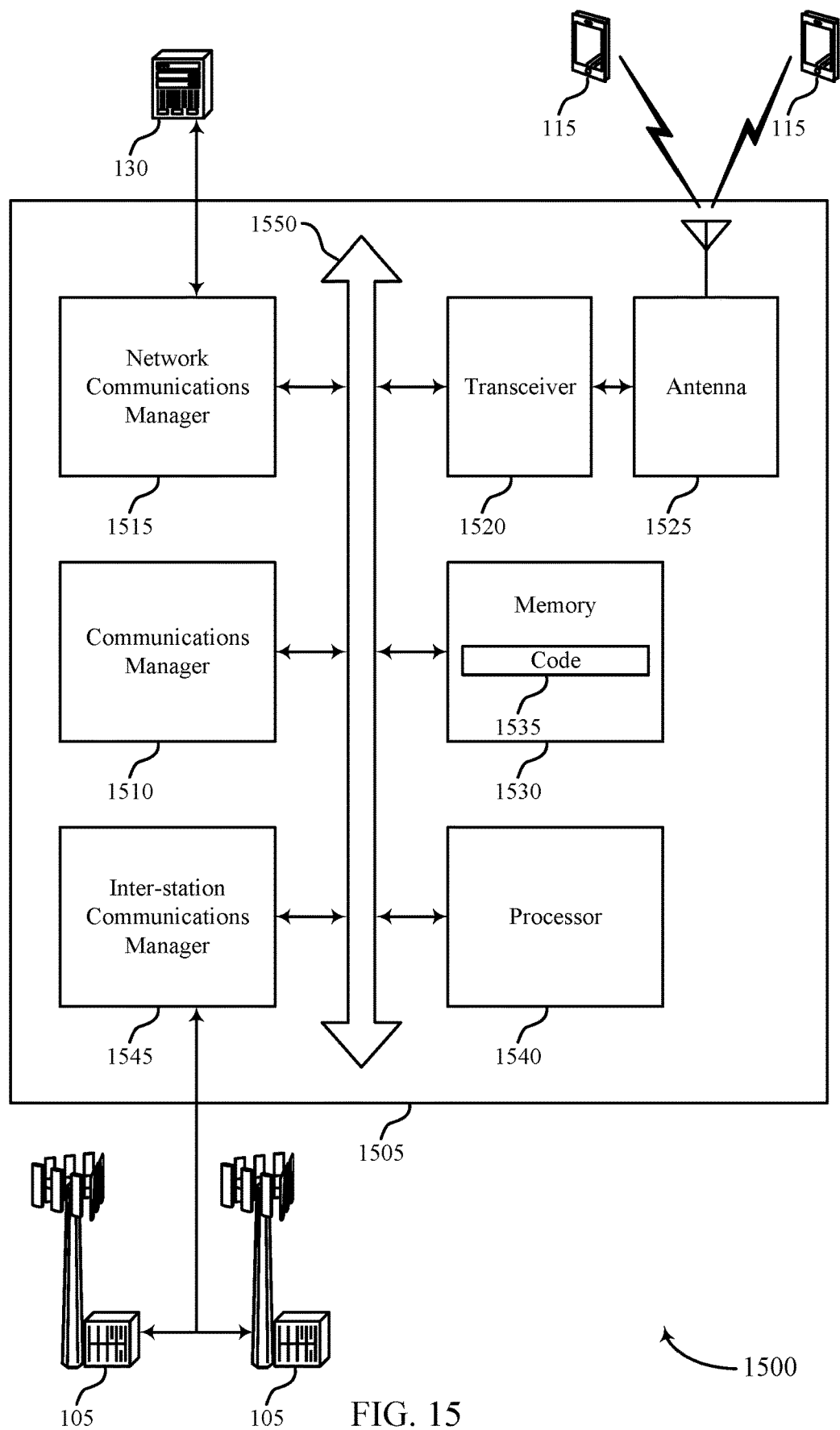
FIG. 15 shows a diagram of a system including a device that supports measurement report triggering techniques for multiple component carriers in accordance with aspects of the present disclosure.

FIG. 15 shows a diagram of a system 1500 including a device 1505 that supports measurement report triggering techniques for multiple component carriers in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may establish a connection with a UE via at least a first CC and a second CC, where the first CC has a different numerology than the second CC, identify a minimum gap between a resource associated with a downlink control channel transmission on the first CC and a resource associated with a reference signal transmission on the second CC, transmit the downlink control channel transmission to the UE via the first CC, transmit, responsive to the downlink control channel transmission, the reference signal transmission to the UE on the second CC based on the minimum gap, and receive, from the UE, one or more measured channel characteristics of the reference signal transmission.

The communications manager 1510 may also establish a connection with a UE via at least a first CC and a second CC, where the first CC has a first numerology and associated first slot duration, and the second CC has a second numerology and associated second slot duration that is shorter than the first slot duration, identify a minimum gap, as a number of slots of the second CC, between a first slot containing a downlink control channel transmission on the first CC and a second slot containing a reference signal transmission on the second CC, where the minimum gap is identified based on a location of the downlink control channel transmission within the first slot, transmit the downlink control channel transmission via the first CC, transmit, responsive to the downlink control channel transmission, the reference signal transmission on the second CC based on the minimum gap, and receive, from the UE, one or more measured channel characteristics of the reference signal transmission.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting measurement report triggering techniques for multiple component carriers).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
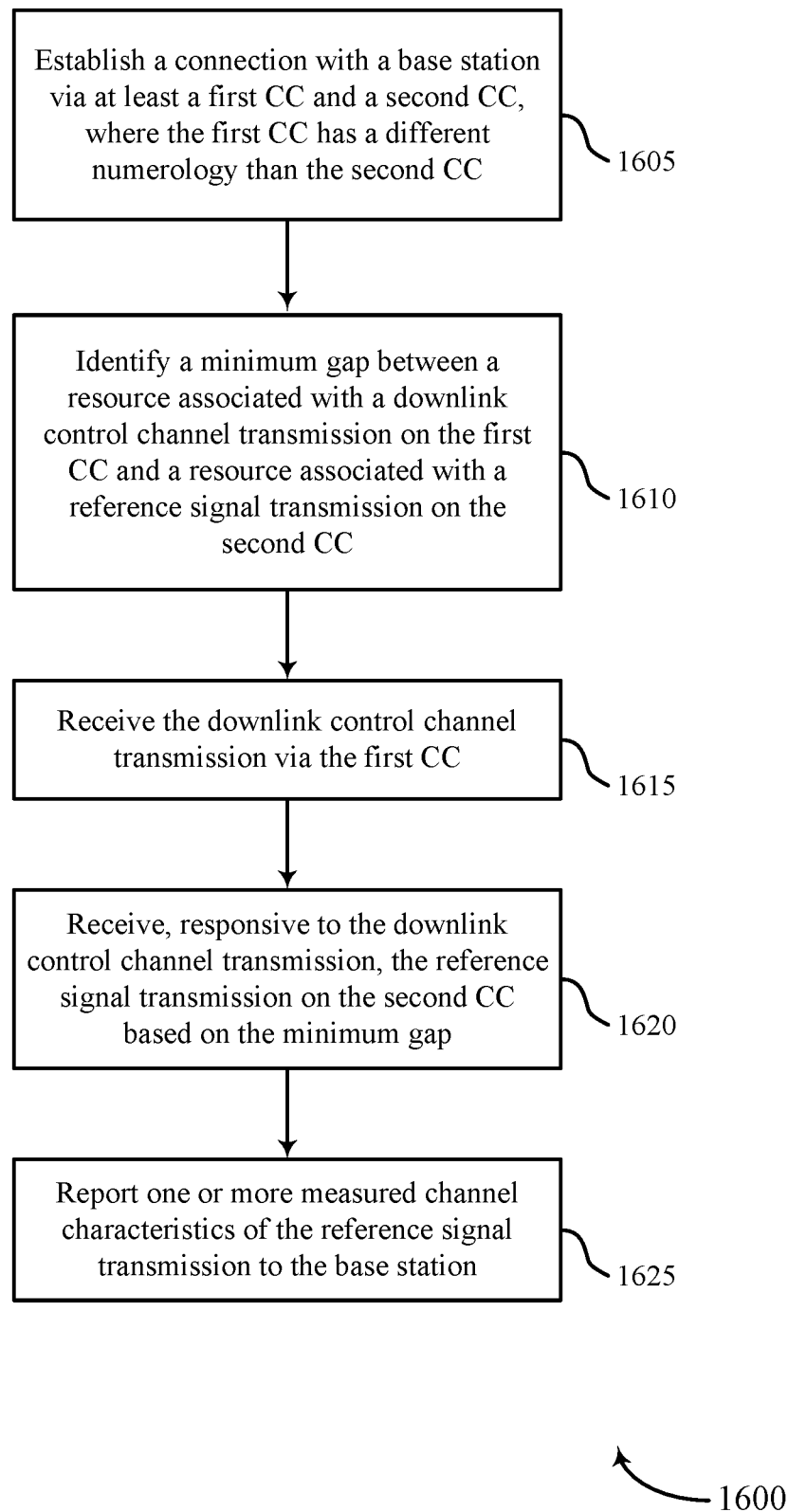
FIGS. 16 through 19 show flowcharts illustrating methods that support measurement report triggering techniques for multiple component carriers in accordance with aspects of the present disclosure.

FIG. 16 shows a flowchart illustrating a method 1600 that supports measurement report triggering techniques for multiple component carriers in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1605, the UE may establish a connection with a base station via at least a first CC and a second CC, where the first CC has a different numerology than the second CC. The operations of 1605 may be performed according to the methods described herein. In some examples, aspects of the operations of 1605 may be performed by a connection establishment component as described with reference to FIGS. 8 through 11.

At 1610, the UE may identify a minimum gap between a resource associated with a downlink control channel transmission on the first CC and a resource associated with a reference signal transmission on the second CC. As an example, the resource associated with the downlink control channel transmission may be an OFDM symbol of the downlink control channel transmission on the first CC, the resource associated with the reference signal transmission may be an OFDM symbol of the reference signal transmission on the second CC, and the minimum gap may be measured in OFDM symbols of a numerology of the second CC. The operations of 1610 may be performed according to the methods described herein. In some examples, aspects of the operations of 1610 may be performed by a gap identification manager as described with reference to FIGS. 8 through 11.

At 1615, the UE may receive the downlink control channel transmission via the first CC. The operations of 1615 may be performed according to the methods described herein. In some examples, aspects of the operations of 1615 may be performed by a downlink control component as described with reference to FIGS. 8 through 11.

At 1620, the UE may receive, responsive to the downlink control channel transmission, the reference signal transmission on the second CC based on the minimum gap. The operations of 1620 may be performed according to the methods described herein. In some examples, aspects of the operations of 1620 may be performed by a reference signal component as described with reference to FIGS. 8 through 11.

At 1625, the UE may report one or more measured channel characteristics of the reference signal transmission to the base station. The operations of 1625 may be performed according to the methods described herein. In some examples, aspects of the operations of 1625 may be performed by a measurement component as described with reference to FIGS. 8 through 11.

Figure 17:
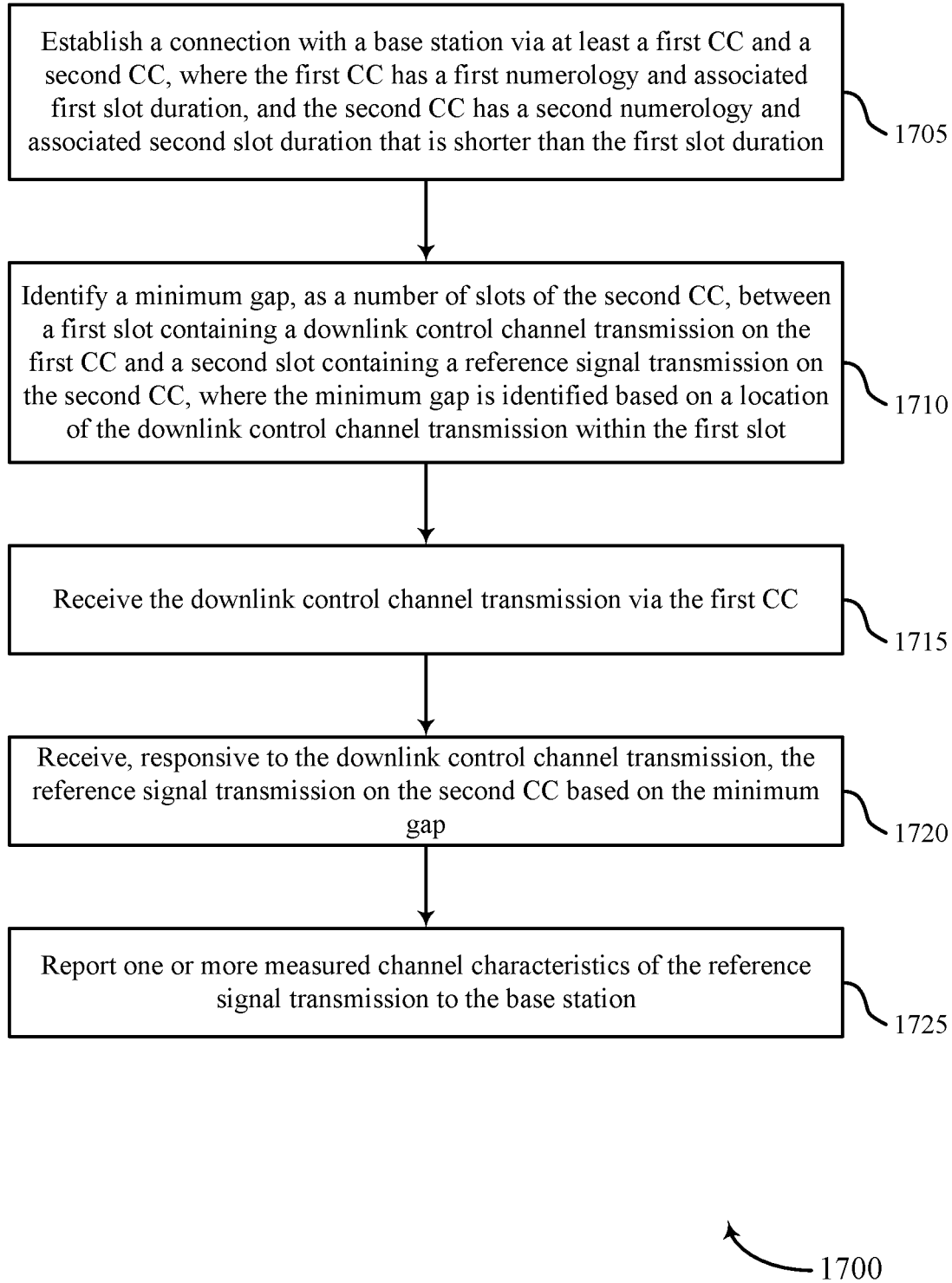

FIG. 17 shows a flowchart illustrating a method 1700 that supports measurement report triggering techniques for multiple component carriers in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1705, the UE may establish a connection with a base station via at least a first CC and a second CC, where the first CC has a first numerology and associated first slot duration, and the second CC has a second numerology and associated second slot duration that is shorter than the first slot duration. The operations of 1705 may be performed according to the methods described herein. In some examples, aspects of the operations of 1705 may be performed by a connection establishment component as described with reference to FIGS. 8 through 11.

At 1710, the UE may identify a minimum gap, as a number of slots of the second CC, between a first slot containing a downlink control channel transmission on the first CC and a second slot containing a reference signal transmission on the second CC, where the minimum gap is identified based on a location of the downlink control channel transmission within the first slot. The operations of 1710 may be performed according to the methods described herein. In some examples, aspects of the operations of 1710 may be performed by a gap identification manager as described with reference to FIGS. 8 through 11.

At 1715, the UE may receive the downlink control channel transmission via the first CC. The operations of 1715 may be performed according to the methods described herein. In some examples, aspects of the operations of 1715 may be performed by a downlink control component as described with reference to FIGS. 8 through 11.

At 1720, the UE may receive, responsive to the downlink control channel transmission, the reference signal transmission on the second CC based on the minimum gap. The operations of 1720 may be performed according to the methods described herein. In some examples, aspects of the operations of 1720 may be performed by a reference signal component as described with reference to FIGS. 8 through 11.

At 1725, the UE may report one or more measured channel characteristics of the reference signal transmission to the base station. The operations of 1725 may be performed according to the methods described herein. In some examples, aspects of the operations of 1725 may be performed by a measurement component as described with reference to FIGS. 8 through 11.

Figure 18:
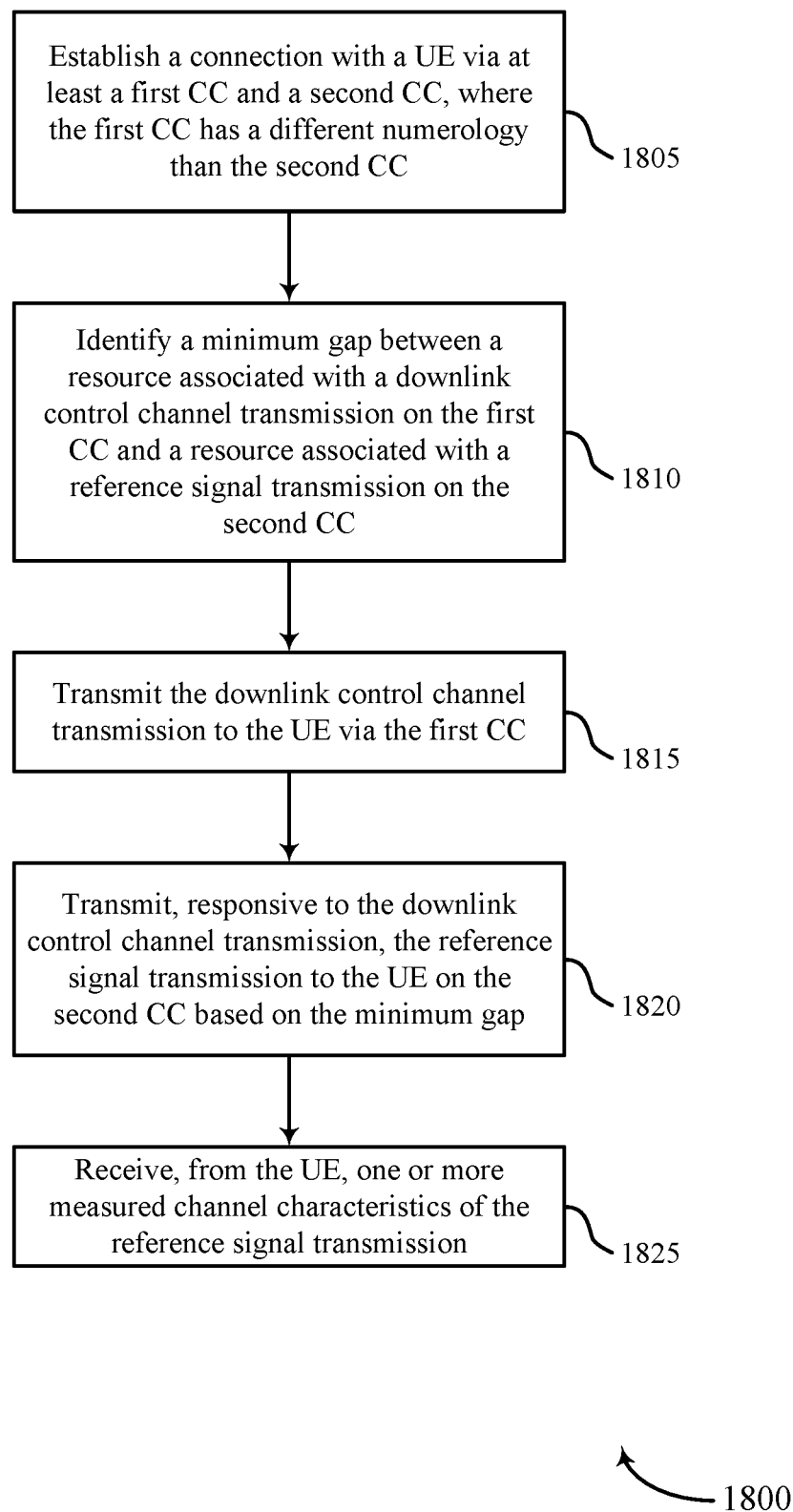

FIG. 18 shows a flowchart illustrating a method 1800 that supports measurement report triggering techniques for multiple component carriers in accordance with aspects of the present disclosure. The operations of method 1800 may be implemented by a base station 105 or its components as described herein. For example, the operations of method 1800 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 1805, the base station may establish a connection with a UE via at least a first CC and a second CC, where the first CC has a different numerology than the second CC. The operations of 1805 may be performed according to the methods described herein. In some examples, aspects of the operations of 1805 may be performed by a connection establishment component as described with reference to FIGS. 12 through 15.

At 1810, the base station may identify a minimum gap between a resource associated with a downlink control channel transmission on the first CC and a resource associated with a reference signal transmission on the second CC. As an example, the resource associated with the downlink control channel transmission may be an OFDM symbol of the downlink control channel transmission on the first CC, the resource associated with the reference signal transmission may be an OFDM symbol of the reference signal transmission on the second CC, and the minimum gap may be measured in OFDM symbols of a numerology of the second CC. The operations of 1810 may be performed according to the methods described herein. In some examples, aspects of the operations of 1810 may be performed by a gap identification manager as described with reference to FIGS. 12 through 15.

At 1815, the base station may transmit the downlink control channel transmission to the UE via the first CC. The operations of 1815 may be performed according to the methods described herein. In some examples, aspects of the operations of 1815 may be performed by a downlink control component as described with reference to FIGS. 12 through 15.

At 1820, the base station may transmit, responsive to the downlink control channel transmission, the reference signal transmission to the UE on the second CC based on the minimum gap. The operations of 1820 may be performed according to the methods described herein. In some examples, aspects of the operations of 1820 may be performed by a reference signal component as described with reference to FIGS. 12 through 15.

At 1825, the base station may receive, from the UE, one or more measured channel characteristics of the reference signal transmission. The operations of 1825 may be performed according to the methods described herein. In some examples, aspects of the operations of 1825 may be performed by a measurement component as described with reference to FIGS. 12 through 15.

Figure 19:
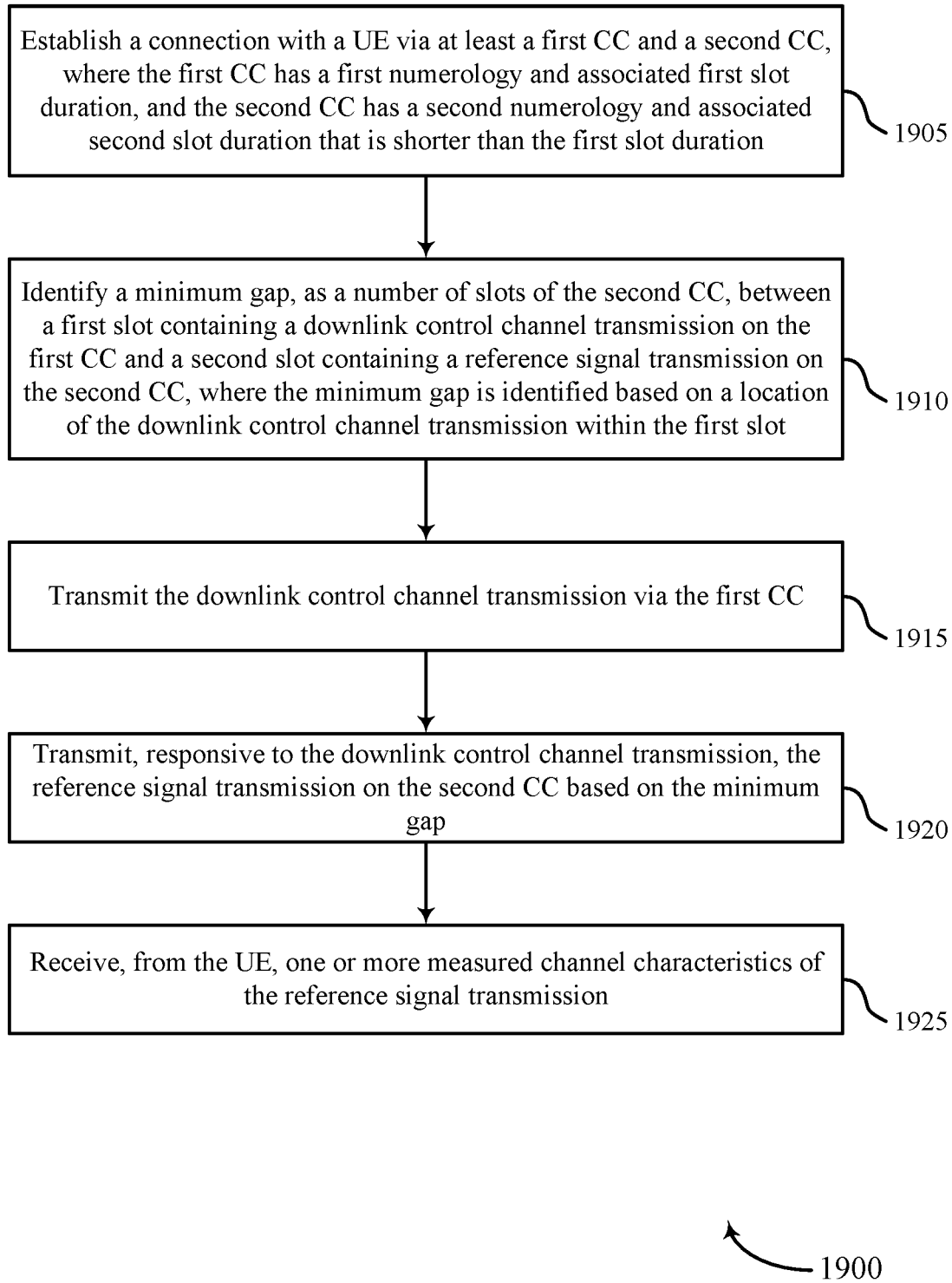

FIG. 19 shows a flowchart illustrating a method 1900 that supports measurement report triggering techniques for multiple component carriers in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 1905, the base station may establish a connection with a UE via at least a first CC and a second CC, where the first CC has a first numerology and associated first slot duration, and the second CC has a second numerology and associated second slot duration that is shorter than the first slot duration. The operations of 1905 may be performed according to the methods described herein. In some examples, aspects of the operations of 1905 may be performed by a connection establishment component as described with reference to FIGS. 12 through 15.

At 1910, the base station may identify a minimum gap, as a number of slots of the second CC, between a first slot containing a downlink control channel transmission on the first CC and a second slot containing a reference signal transmission on the second CC, where the minimum gap is identified based on a location of the downlink control channel transmission within the first slot. The operations of 1910 may be performed according to the methods described herein. In some examples, aspects of the operations of 1910 may be performed by a gap identification manager as described with reference to FIGS. 12 through 15.

At 1915, the base station may transmit the downlink control channel transmission via the first CC. The operations of 1915 may be performed according to the methods described herein. In some examples, aspects of the operations of 1915 may be performed by a downlink control component as described with reference to FIGS. 12 through 15.

At 1920, the base station may transmit, responsive to the downlink control channel transmission, the reference signal transmission on the second CC based on the minimum gap. The operations of 1920 may be performed according to the methods described herein. In some examples, aspects of the operations of 1920 may be performed by a reference signal component as described with reference to FIGS. 12 through 15.

At 1925, the base station may receive, from the UE, one or more measured channel characteristics of the reference signal transmission. The operations of 1925 may be performed according to the methods described herein. In some examples, aspects of the operations of 1925 may be performed by a measurement component as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    establishing a connection with a base station via at least a first component carrier (CC) and a second CC, wherein the first CC has a different numerology than the second CC;
    receiving a downlink control channel transmission via the first CC;
    receiving, responsive to the downlink control channel transmission triggering a reference signal transmission, one or more channel state information reference signals of the reference signal transmission on the second CC based at least in part on a minimum gap between a resource associated with the downlink control channel transmission on the first CC and a resource associated with the reference signal transmission on the second CC, wherein the minimum gap is based at least in part on a numerology of the first CC being greater than or less than a numerology of the second CC; and
    measuring one or more channel characteristics of the reference signal transmission.

2. The method of claim 1, wherein the resource associated with the downlink control channel transmission comprises an orthogonal frequency division multiplexing (OFDM) symbol of the downlink control channel transmission on the first CC, the resource associated with the reference signal transmission comprises an OFDM symbol of the reference signal transmission on the second CC, and the minimum gap is measured in OFDM symbols of the numerology of the first CC.

3. The method of claim 1, wherein the resource associated with the downlink control channel transmission comprises a first slot containing the downlink control channel transmission on the first CC, the resource associated with the reference signal transmission comprises a second slot containing the reference signal transmission on the second CC, and the minimum gap is measured as a number of slots of the second CC, wherein the minimum gap is identified based at least in part on a location of the downlink control channel transmission within the first slot.

4. The method of claim 1, further comprising:
    transmitting an indication of the minimum gap to the base station.

5. The method of claim 4, wherein the indication of the minimum gap is provided for a plurality of different numerology combinations of the first CC and the second CC.

6. The method of claim 1, wherein the minimum gap is measured with respect to a first or last orthogonal frequency division multiplexing (OFDM) symbol of the downlink control channel transmission relative to a first or last OFDM symbol of the reference signal transmission.

7. The method of claim 1, wherein the minimum gap is based at least in part on a difference between the numerology of the first CC and the numerology of the second CC.

8. The method of claim 7, wherein a same minimum gap is provided for each of a plurality of different numerology combinations.

9. The method of claim 1, wherein the minimum gap is further based at least in part on a beam switching gap of the UE.

10. The method of claim 9, wherein the minimum gap is determined as a sum of a minimum offset between the downlink control channel transmission and the reference signal transmission and the beam switching gap, or based on a maximum value of the minimum offset or the beam switching gap.

11. The method of claim 10, wherein the minimum offset is prespecified for each of a plurality of different numerology combinations.

12. The method of claim 11, wherein a same minimum offset is provided for each of the plurality of different numerology combinations.

13. The method of claim 1, wherein the minimum gap is identified when the second CC has a shorter resource duration than the first CC.

14. The method of claim 1, wherein the minimum gap is determined based at least in part on a duration of the downlink control channel transmission and a scaling factor, wherein the scaling factor is proportional to a difference in the numerology of the first CC and the numerology of the second CC.

15. The method of claim 1, wherein the minimum gap is provided for each frequency band combination configured for the connection with the base station, for each frequency band pair combination configured for the connection with the base station, or any combinations thereof.

16. The method of claim 1, wherein the UE transmits minimum gap information to the base station that indicates minimum gaps for two or more frequency band combinations configured for the connection with the base station, two or more frequency band pair combinations configured for the connection with the base station, one or more frequency band pair combination that is unsupported by the UE, or any combinations thereof.

17. The method of claim 1, wherein the minimum gap comprises a first quantity of symbols based at least in part on the numerology of the first CC being greater than the numerology of the second CC or a second quantity of symbols different than the first quantity of symbols based at least in part on the numerology of the first CC being less than the numerology of the second CC.

18. A method for wireless communication at a base station, comprising:
    establishing a connection with a user equipment (UE) via at least a first component carrier (CC) and a second CC, wherein the first CC has a different numerology than the second CC;
    identifying a minimum gap between a resource associated with a downlink control channel transmission on the first CC and a resource associated with a reference signal transmission on the second CC, wherein the minimum gap is based at least in part on a numerology of the first CC being greater than or less than a numerology of the second CC;
    transmitting the downlink control channel transmission to the UE via the first CC; and
    transmitting, responsive to the downlink control channel transmission triggering a reference signal transmission, one or more channel state information reference signals of the reference signal transmission to the UE on the second CC based at least in part on the minimum gap.

19. The method of claim 18, wherein the resource associated with the downlink control channel transmission comprises an orthogonal frequency division multiplexing (OFDM) symbol of the downlink control channel transmission on the first CC, the resource associated with the reference signal transmission comprises an OFDM symbol of the reference signal transmission on the second CC, and the minimum gap is measured in OFDM symbols of the numerology of the first CC.

20. The method of claim 18, wherein the resource associated with the downlink control channel transmission comprises a first slot containing the downlink control channel transmission on the first CC, the resource associated with the reference signal transmission comprises a second slot containing the reference signal transmission on the second CC, and the minimum gap is measured as a number of slots of the second CC, wherein the minimum gap is identified based at least in part on a location of the downlink control channel transmission within the first slot.

21. The method of claim 18, further comprising:
receiving, from the UE, an indication of the minimum gap.

22. The method of claim 21, wherein the indication of the minimum gap is provided for a plurality of different numerology combinations of the first CC and the second CC.

23. The method of claim 18, wherein the minimum gap is measured with respect to a first or last orthogonal frequency division multiplexing (OFDM) symbol of the downlink control channel transmission relative to a first or last OFDM symbol of the reference signal transmission.

24. The method of claim 18, wherein the minimum gap is further based at least in part on a beam switching gap of the UE.

25. The method of claim 24, wherein the minimum gap is determined as a sum of an offset between the downlink control channel transmission and the reference signal transmission and the beam switching gap, or based on a maximum value of the offset or the beam switching gap.

26. The method of claim 18, wherein the minimum gap is identified when the second CC has a shorter resource duration than the first CC.

27. The method of claim 18, wherein the minimum gap is determined based at least in part on a duration of the downlink control channel transmission and a scaling factor, wherein the scaling factor is proportional to a difference in the numerology of the first CC and the numerology of the second CC.

28. The method of claim 18, wherein the minimum gap is identified for each frequency band combination configured for the connection with the base station, for each frequency band pair combination configured for the connection with the base station, or any combinations thereof.

29. The method of claim 18, wherein the base station receives minimum gap information from the UE that indicates minimum gaps for two or more frequency band combinations configured for the connection with the base station, two or more frequency band pair combinations configured for the connection with the base station, one or more frequency band pair combination that is unsupported by the UE, or any combinations thereof.

30. The method of claim 18, wherein the minimum gap comprises a first quantity of symbols based at least in part on the numerology of the first CC being greater than the numerology of the second CC or a second quantity of symbols different than the first quantity of symbols based at least in part on the numerology of the first CC being less than the numerology of the second CC.

31. An apparatus for wireless communication at a user equipment (UE), comprising:
a processor,
memory coupled with the processor; and
instructions stored in the memory and executable by the processor to cause the apparatus to:
establish a connection with a base station via at least a first component carrier (CC) and a second CC, wherein the first CC has a different numerology than the second CC;
receive a downlink control channel transmission via the first CC;
receive, responsive to the downlink control channel transmission triggering a reference signal transmission, one or more channel state information reference signals of the reference signal transmission on the second CC based at least in part on a minimum gap between a resource associated with the downlink control channel transmission on the first CC and a resource of associated with the reference signal transmission on the second CC, wherein the minimum gap is based at least in part on a numerology of the first CC being greater than or less than a numerology of the second CC; and
measure one or more channel characteristics of the reference signal transmission.

32. An apparatus for wireless communication at a base station, comprising:
a processor,
memory coupled with the processor; and
instructions stored in the memory and executable by the processor to cause the apparatus to:
establish a connection with a user equipment (UE) via at least a first component carrier (CC) and a second CC, wherein the first CC has a different numerology than the second CC;
identify a minimum gap between a resource associated with a downlink control channel transmission on the first CC and a resource of associated with a reference signal transmission on the second CC, wherein the minimum gap is based at least in part on a numerology of the first CC being greater than or less than a numerology of the second CC;
transmit the downlink control channel transmission to the UE via the first CC; and
transmit, responsive to the downlink control channel transmission triggering a reference signal transmission, one or more channel state information reference signals of the reference signal transmission to the UE on the second CC based at least in part on the minimum gap.

* * * * *